(12) United States Patent
Masushige et al.

(10) Patent No.: US 7,212,962 B2
(45) Date of Patent: May 1, 2007

(54) HOST-TERMINAL EMULATION PROGRAM, A RELAY PROGRAM, A HOST-TERMINAL EMULATION METHOD, A COMMUNICATION PROGRAM, A COMMUNICATION METHOD, AND A CLIENT COMPUTER

(75) Inventors: Akinori Masushige, Kawasaki (JP); Yukio Hirao, Kawasaki (JP); Masahide Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 10/391,700

(22) Filed: Mar. 19, 2003

(65) Prior Publication Data

US 2003/0187631 A1 Oct. 2, 2003

(30) Foreign Application Priority Data

Mar. 29, 2002 (JP) ............................. 2002-093954
Feb. 10, 2003 (JP) ............................. 2003-032727

(51) Int. Cl.
*G06F 9/455* (2006.01)
*G06F 13/00* (2006.01)

(52) U.S. Cl. ........................... 703/24; 703/14; 709/219; 709/227

(58) Field of Classification Search .................. 703/25, 703/27, 22, 24, 14; 709/227, 238, 217, 204, 709/219; 716/18

See application file for complete search history.

(56) References Cited

U.S. PATENT DOCUMENTS 5,754,830 A 5/1998 Butts et al. ................. 395/500
5,905,872 A * 5/1999 DeSimone et al. ......... 709/245
6,205,415 B1 3/2001 Butts et al. .................... 703/27
6,205,416 B1 3/2001 Butts et al. .................... 703/27
6,205,417 B1 3/2001 Butts et al. .................... 703/27
6,216,101 B1 4/2001 Butts et al. .................... 703/27
6,233,541 B1 5/2001 Butts et al. .................... 703/27
6,233,542 B1 5/2001 Butts et al. .................... 703/27
6,233,543 B1 5/2001 Butts et al. .................... 703/27
6,240,462 B1 * 5/2001 Agraharam et al. ........ 709/238
6,539,536 B1 * 3/2003 Singh et al. .................. 716/18
6,640,241 B1 * 10/2003 Ozzie et al. ................ 709/204
6,842,777 B1 * 1/2005 Tuli ............................. 709/217
6,983,465 B2 * 1/2006 Mandal et al. .............. 719/320
2002/0091834 A1* 7/2002 Isozu et al. .................. 709/227
2003/0149746 A1* 8/2003 Baldwin et al. ............. 709/219

FOREIGN PATENT DOCUMENTS

WO 97/37303 10/1997

* cited by examiner

*Primary Examiner*—Thai Phan
(74) *Attorney, Agent, or Firm*—Greer, Burns & Crain, Ltd.

(57) ABSTRACT

A host-terminal emulation program which permits secure host linkage communication between a host within a protected network and a client outside the network. The client establishes in advance a receiving connection with a relay device, for receiving data compliant to a second protocol (Step S1). Subsequently, the client establishes a transmitting connection with the relay device, for transmitting data compliant to the second protocol (Step S2), and transmits data to the relay device via the transmitting connection (Step S3). The relay device converts the data to a first protocol (Step S4), and transmits the converted data to the host (Step S5). On completion of data processing by the host (Step S6), the processing result is transmitted to the relay device by means of the first protocol (Step S7). The processing result is converted to the second protocol in the relay device (Step S8) and transferred to the client (Step S9).

16 Claims, 13 Drawing Sheets

HOST-TERMINAL EMULATION PROGRAM, A RELAY PROGRAM, A HOST-TERMINAL EMULATION METHOD, A COMMUNICATION PROGRAM, A COMMUNICATION METHOD, AND A CLIENT COMPUTER

BACKGROUND OF THE INVENTION

(1) Field of the Invention

The present invention relates to a host-terminal emulation program, a relay program, a host-terminal emulation method, a communication program, a communication method and a client computer. More particularly, the invention relates to a host-terminal emulation program, relay program and host-terminal emulation method allowing communication between a host and a terminal via a gateway, as well as to a communication program, communication method and client computer for communicating with a server by means of a protocol which follows a communication procedure such that the server responds to a request from a client side.

(2) Description of the Related Art

Conventional schemes for computer networks include a method in which a terminal device (hereinafter merely referred to as terminal) interactively accesses a host computer (hereinafter merely referred to as host) that processes data in a centralized fashion. Interactive access is a form of access wherein a terminal logs in onto the host with the use of a predetermined account and a command corresponding to an input operation is entered into the host or the output data from the host is displayed at the terminal. A system like this is called host-centralized processing system.

In such a host-centralized processing system, the host processes data in a centralized manner while the terminal does not perform complicated data processing. The terminal may therefore have only the function of transmitting the content of input operation to the host and the function of displaying information received from the host. Dumb terminals have hitherto been used widely as such terminals.

Recently, client-server system has come to be widely used as a computer network. The client-server system is a system wherein computers which can also function as stand-alone machines, such as workstations or personal computers, are interconnected to constitute a network.

The diffusion of client-server system has permitted each user to use his/her own workstation or personal computer that functions as a client computer (hereinafter merely referred to as client). However, there still exists a type of transaction suited for the conventional host-centralized processing; therefore, in some cases, a host-centralized processing system and a client-server system are both constructed on the same network.

To cope with such a situation, a technique has become popular in recent years wherein each client is imparted a terminal function by application software and makes use of the host by means of the terminal function. A system like this is hereinafter called host linkage processing system.

Currently, communication for host linkage processing is implemented using an Internet/intranet protocol such as TN (TelNet) protocol (conformable to TN3270 standard (RFC1646), TN3270E standard (RFC1647), etc.). Also, there has been proposed a technique for connecting a client system and a server system through a persistent TCP/IP socket connection and connecting the server system and a legacy host system through a similarly persistent TCP/IP socket connection (PCT-based Japanese Patent Publication No. 2001-509286). Both of these techniques enable host linkage processing.

Basically, a client accesses the host via a LAN (Local Area Network), but a technique of using a telephone line or the like to link the client with the host at a remote place is also generally used.

Also, because of recent popularization of the Internet, techniques have been established to link a client with a host via the Internet or to link a client with a remote host by means of TCP/IP (Transmission Control Protocol/Internet Protocol) or an application protocol that works on TCP/IP. Availability of the host function via the Internet serves to further the convenience of the host-centralized processing system.

However, network communications through the Internet/intranet are associated with security problems. The following four can be listed as the security problems with the Internet/intranet:

(1) The network is susceptible to network attacks (illegal communication aiming at a computer within a protected network) such as illegal access.

(2) The network admits of impersonation (act of accessing the network by an impersonating originator).

(3) The network admits of eavesdropping on communication data (act of illegally acquiring and reading the contents of communication data addressed to another person).

(4) The network admits of falsification of communication data (act of illegally rewriting the contents of communication data addressed to another person).

It is virtually impossible to perfectly avoid the above illegal acts on the Internet/intranet infrastructure. Accordingly, measures need to be taken so that no damage may be caused by the illegal acts. In the case of an intranet, the number of malicious third parities is presumably small, compared with the case of the Internet; however, no one can guarantee that there is no malicious third party, and thus the degree of risk to an intranet should be regarded as equivalent to that to the Internet.

Various solutions to the security problems have been devised, and in general, measures mentioned below are taken.

(1) Network attacks such as illegal access can be coped with by restricting protocols that can pass through the network. Specifically, it is difficult to cope with all probable attacks while allowing the passage of all protocols, and also such an attempt leads to enormous costs. Accordingly, a firewall or the like is used to restrict the protocols to be monitored or the port numbers of TCP/IP connections to the smallest possible number (e.g. only to HTTP (HyperText Transfer Protocol), POP (Post Office Protocol)/SMTP (Simple Mail Transfer Protocol)). This serves to limit the objects requiring attention to a narrow range, making it possible to improve the security.

(2) Impersonation can be coped with by authenticating originators. Specifically, whether a party connected with is truly an intended person or not is checked by using a password etc. This prevents communication with a person impersonating another.

(3) Eavesdropping on communication data can be coped with by encrypting the data. Once communication data is encrypted, the content thereof is incomprehensible to a third party. Thus, if one tries to eavesdrop on such data, the content of the data is never known to him/her.

(4) Falsification of communication data can be coped with by detecting traces of falsification for every received data. By detecting falsification of received data, it is possible to prevent falsified data, if received, from being used mistakenly. Where falsified data is received, the sender is requested to again transmit data until correct data is received, whereby correct data can be acquired.

In cases where host linkage processing is carried out through the Internet or intranet, however, another security problem that cannot be solved by the conventional techniques arises for the reason stated below.

Generally, TN protocol used for host linkage processing is blocked in order to counter network attacks such as illegal access. Namely, in Internet/intranet environments in which no host linkage processing is performed, TN connection cannot be established beyond the restrictions on communications imposed by a firewall.

However, in order to permit host linkage communications through the Internet or intranet, it is necessary that the restriction on TN protocol communication imposed by a firewall should be removed. This makes it possible to perform host linkage communications by means of TN protocol via a firewall but at the same time creates a dangerous security hole.

If host linkage processing can be executed by means of HTTP protocol that can pass through the firewall, then the reliability of security can be maintained without lifting the restrictions on TN protocol communication. However, host linkage communication by means of HTTP protocol is associated with the following technical problem.

Specifically, a host-centralized processing system requires that asynchronous bidirectional communication should be carried out between a host terminal and the host. This means that also in the case where host linkage processing is executed through the Internet or intranet, bidirectional communication that occurs at random timing needs to be processed.

However, the HTTP protocol used for the communication between an HTTP client and a Web server follows such a procedure that it is always the Web server that responds to a request from the client side. Thus, as far as the procedure is used in the ordinary way, it is not possible to transmit communication data generated by the host at random timing to the client side. Accordingly, a novel technique is needed which enables asynchronous bidirectional communication by means of a protocol following such a procedure that the server responds to a request from the client side.

If persistent connection is used to connect an HTTP client and a Web server as disclosed in PCT-based Japanese Patent Publication No. 2001-509286, a malicious third party is given sufficient time to analyze the connection to the host, resulting in lowering of the security of the system which must be protected by the firewall.

SUMMARY OF THE INVENTION

The present invention was created in view of the above circumstances, and an object thereof is to provide a host-terminal emulation program, relay program and host-terminal emulation method which permit host linkage communications to be safely performed between a host within a protected network and a client outside the network.

Another object of the present invention is to provide a communication program, communication method and client computer for performing asynchronous bidirectional communication by means of a protocol which follows a communication procedure such that a server responds to a request from a client.

To achieve the first object, there is provided a host-terminal emulation program for performing a function as a terminal of a host computer, the terminal being connectable, via a firewall which blocks passage of a first protocol, to the host computer which permits interactive operation from a remote place by means of the first protocol. The host-terminal emulation program causes a computer to perform a process of establishing in advance a receiving connection with a relay device for receiving data compliant to a second protocol of which passage through the firewall is permitted, the relay device having a function of mutual data format conversion between the first and second protocols and connected to the computer through the firewall, establishing a transmitting connection with the relay device for transmitting data compliant to the second protocol when data is to be transmitted to the host computer in response to an input operation, transmitting, via the transmitting connection, data entered by the input operation to the relay device by means of the second protocol, and receiving, from the relay device via the receiving connection, output data from the host computer by means of the second protocol.

Also, to achieve the second object, there is provided a communication program for performing a function of communicating with a server by means of a protocol following a communication procedure such that the server responds to a request from a client. The communication program causes a computer to perform a process of establishing in advance a receiving connection with the server for receiving data compliant to the protocol, establishing a transmitting connection with the server for transmitting data compliant to the protocol when data is to be transmitted in response to an input operation, transmitting, via the transmitting connection, data entered by the input operation to the server by means of the protocol, and receiving, via the receiving connection, output data from the server by means of the protocol.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

First, the invention applied to embodiments will be outlined, and then specific embodiments of the present invention will be described.

Figure 1:
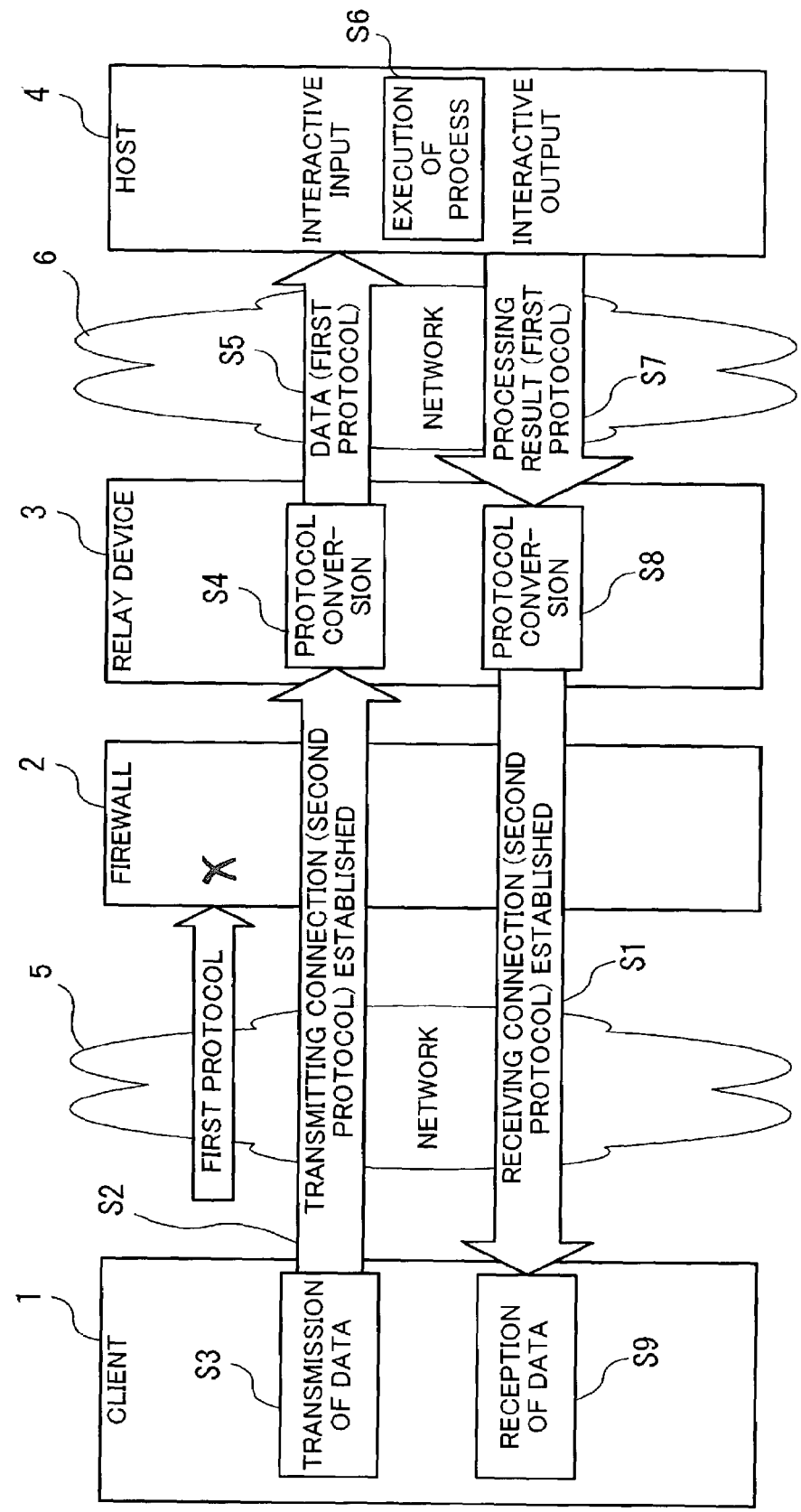
FIG. 1 is a conceptual diagram illustrating the invention applied to embodiments.

FIG. 1 is a conceptual diagram illustrating the invention applied to the embodiments. As shown in FIG. 1, a host linkage processing system comprises a client computer (client) 1, a firewall 2, a relay device 3, and a host computer (host) 4. The client 1 and the firewall 2 are connected to a network 5. The firewall 2, the relay device 3 and the host 4 are connected to another network 6. The network 6 is protected by the firewall 2 from access of computers connected to the network 5.

The host 4 permits interactive access by means of a first protocol. Interactive access is a form of access in which, like telnet, for example, a terminal logs in onto the host 4 and data is input and output interactively. In the interactive access, input of data to the host 4 and output of data (not limited to a response to input) from the host 4 are carried out at random timing. A protocol enabling such interactive access is, for example, TN protocol.

The firewall 2 blocks communications of the first protocol. Namely, computers on the network 5 are unable to directly access the host 4 by means of the first protocol. The firewall 2 permits communications of a second protocol.

To cause the client 1 to function as a terminal of the host 4, the process described below is performed. The relay device 3 has the function of mutual data format conversion between the first and second protocols.

First, the client 1 establishes in advance a receiving connection for receiving data compliant to the second protocol, with the relay device 3 connected thereto through the firewall 2 (Step S1). Subsequently, as transmitting data to the host 4 in response to an input operation, the client 1 establishes a transmitting connection with the relay device 3, for transmitting data compliant to the second protocol (Step S2). Then, using the transmitting connection, the client transmits data entered by the input operation to the relay device 3 by means of the second protocol (Step S3).

The relay device 3 converts the data received from the client 1 to data compliant to the first protocol (Step S4). Then, the relay device 3 transmits the resulting data, thus converted to the first protocol, to the host 4 (Step S5).

The host 4 performs interactive input operation and executes data processing (Step S6). The data processing may be a processing in response to the data (e.g., host linkage) received from the client 1, or a processing initiated at predetermined timing and specifying in advance the client 1 as the destination of output.

On completion of the data processing by the host 4, the result of processing is transmitted by means of the first protocol from the host 4 to the relay device 3 as an interactive output (Step S7). The relay device 3 then converts the data format of the processing result to the second protocol and, using the receiving connection, transmits data indicating the processing result to the client 1 (Step S8). The data is received by the client 1 and displayed (Step S9).

Thus, host linkage can be established between the client 1 and the host 4 while blocking communications of the first protocol by the firewall 2. Since the first protocol is blocked by the firewall 2, it is possible to prevent the computers within the network 6 from being illegally accessed by means of the first protocol.

Specifically, the first protocol is a protocol which permits interactive operation from a remote place, and accordingly, if the first protocol is allowed to pass through the firewall 2, all computers within the protected network 6 are exposed to danger of illegal access by means of the first protocol. According to the present invention, access using the first protocol is blocked by the firewall 2, whereby the computers on the network 6 can be protected from illegal access using the first protocol.

Further, since the receiving connection is established in advance, data, even if output from the host 4 at random timing, can be received by the client 1. Namely, the client 1, which is connected to the host 4 through the firewall 2, can function just like a terminal (e.g., dumb terminal) connected directly to the host 4 (e.g., by a serial communication cable).

In the process illustrated in FIG. 1, where the relay device 3 is regarded as an ordinary server, asynchronous bidirectional communication is accomplished by means of a protocol which follows a communication procedure such that the server (relay device 3) responds to a request from the client 1. In this case, the server 3 need not have data relay functions (function of establishing a connection with the host 4 and protocol conversion function). With asynchronous bidirectional communication, both the client and the server can transmit data to its destination at random timing. In the case where HTTP protocol is used as the communication protocol, for example, a Web server can actively deliver data to an HTTP client so that the contents of the data may be displayed at the HTTP client.

Moreover, the client-server connection can be cut off each time the transfer of data has been completed. In this case, after receiving data via the receiving connection, the client cuts off the existing receiving connection and then again establishes a receiving connection for receiving subsequent data. This lessens the danger of the connection content being analyzed by a malicious third party. In consequence, security can be maintained at a high level, compared with the case of using one persistent connection to carry out bidirectional communication.

[First Embodiment]

Figure 2:
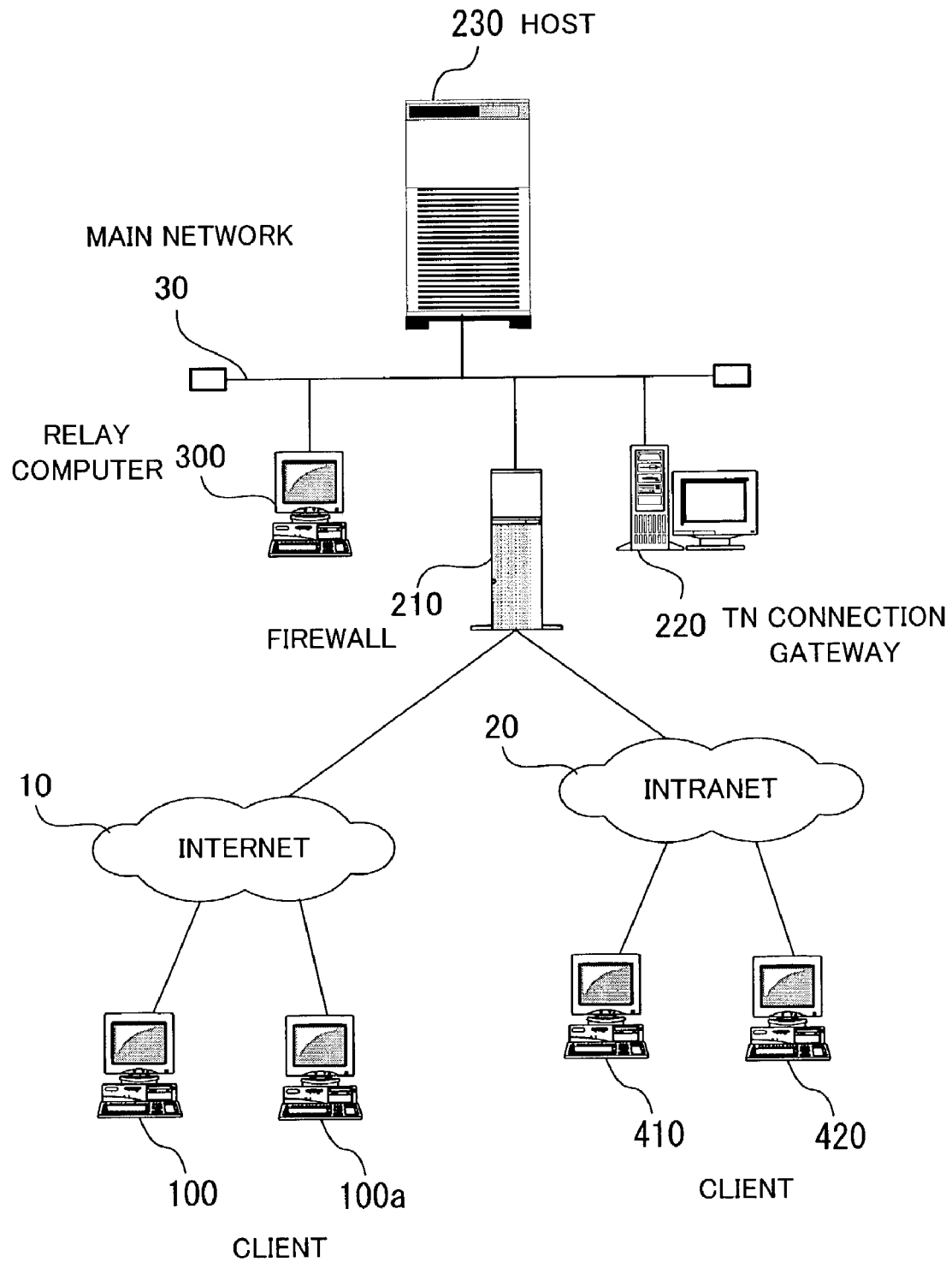
FIG. 2 is a diagram illustrating an exemplary configuration of a host linkage processing system according to a first embodiment.

FIG. 2 illustrates an exemplary configuration of a host linkage processing system according to a first embodiment. In the first embodiment, a plurality of clients 100, 100a are connected to a firewall 210 via the Internet 10. Similarly, a plurality of clients 410, 420 are connected to the firewall 210 via an intranet 20. The firewall 210 is connected via a main network 30 to a relay computer 300, a TN connection gateway 220, and a host 230. The main network 30 is a computer network which is required of high security against illegal access from outside.

The clients 100, 100a, 410, 420 are each a computer having a host-terminal function. The host-terminal function is implemented by application software and includes, for example, a communication function by means of TN protocol. The TN protocol is a device (=protocol) whereby host linkage data stream is transmitted by a telnet (virtual terminal) command. The difference between the TN protocol and the telnet resides in that while the telnet performs character-by-character transmission, as in personal computer communication, and has no such entry as an input field, the TN protocol performs block-by-block transfer and permits control of fields, attributes, etc.

The firewall 210 is constituted by a computer for restricting access to the main network 30 from the Internet 10. Access restriction can be achieved by specifying port numbers. In the first embodiment, HTTP access alone is admitted while the other accesses are blocked. The port number for HTTP is, in general, "80", and HTTP is a protocol used by Web servers to deliver contents. Various techniques have therefore been devised to protect Web servers against illegal access etc. via HTTP communication; accordingly, security of the main network 30 can be maintained even if HTTP communication is admitted through the firewall 210.

The relay computer 300 is a computer which relays communication data between each of the clients 100, 100a, 410, 420 and the host 230. Specifically, the relay computer 300 receives via the firewall 210 an HTTP request output from the client 100, 100a, 410, 420, and converts the HTTP request to TN protocol-compliant data. Then, the relay computer 300 transmits the data thus converted to the TN protocol to the host 230 via the TN connection gateway 220. Also, on receiving TN protocol-compliant response data output from the host 230, the relay computer 300 converts the TN protocol-compliant response data to HTTP-compliant response data (HTTP response). The relay computer 300 then transmits the HTTP response by means of HTTP to the client 100, 100a, 410, 420 through the firewall 210.

The TN connection gateway 220 is a gateway which permits communications with the host 230 by means of TN protocol. In the first embodiment, the TN connection gateway 220 receives a TN protocol-compliant request via the relay computer 300 and accesses the host 230 in accordance with the TN protocol-compliant request.

The host 230 is a general-purpose computer for executing a variety of data processing. In response to a request from the client 100, 100a, 410, 420, for example, the host 230 executes the required process. Also, in some cases, the host 230 automatically executes a prespecified process at a preset time and transmits the result of processing to the client 100, 100a, 410, 420.

Figure 3:
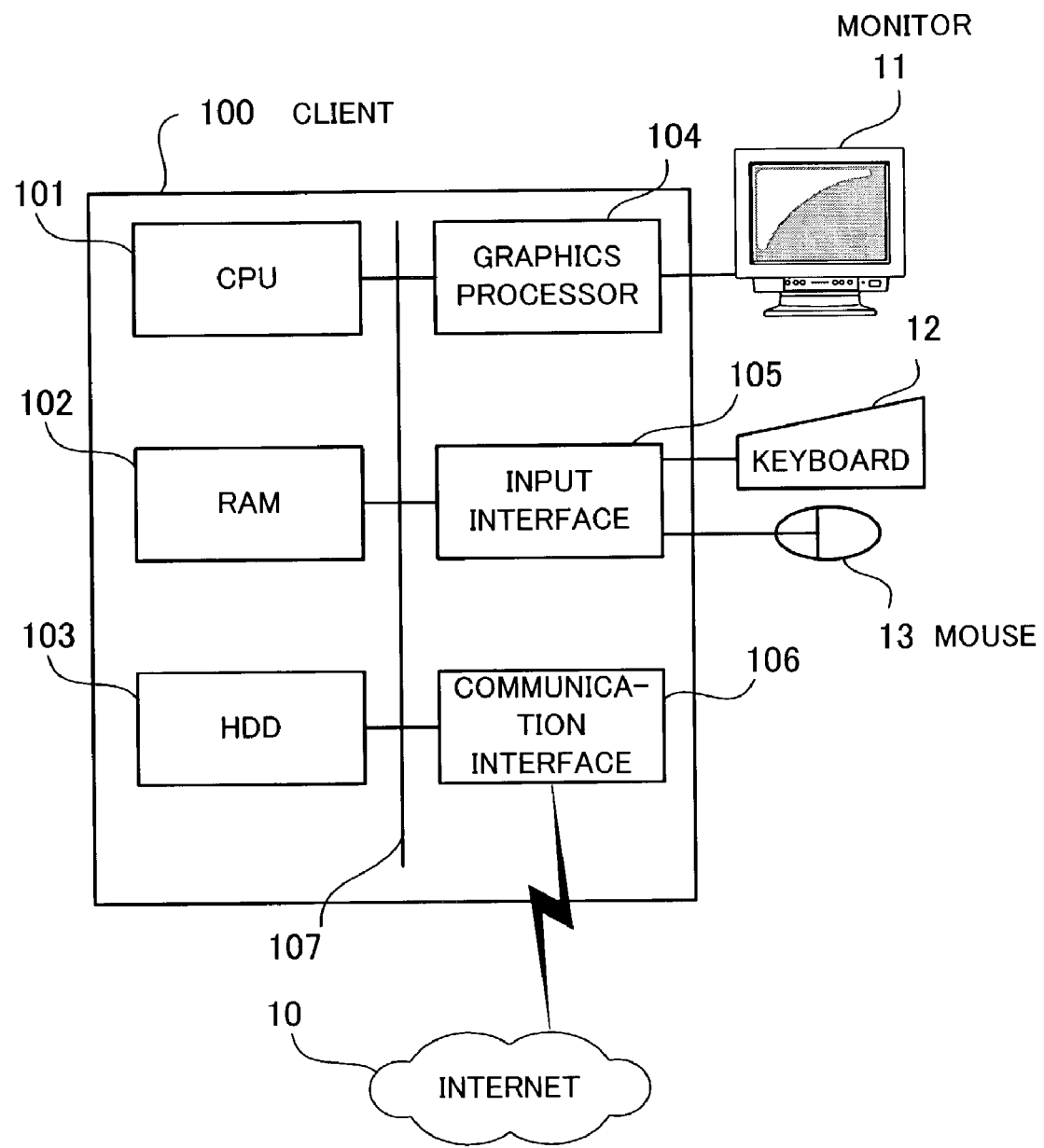
FIG. 3 is a diagram illustrating an exemplary hardware configuration of a client used in the embodiment of the present invention.

FIG. 3 shows an exemplary hardware configuration of the client used in the embodiment of the present invention. The client 100 is in its entirety under the control of a CPU (Central Processing Unit) 101. To the CPU 101 are connected via a bus 107 a RAM (Random Access Memory) 102, a hard disk drive (HDD) 103, a graphics processor 104, an input interface 105, and a communication interface 106.

The RAM 102 temporarily stores at least part of OS (Operating System) programs and application programs executed by the CPU 101. Also, the RAM 102 stores various data necessary for the processing by the CPU 101. The HDD 103 stores the OS and application programs.

The graphics processor 104 is connected with a monitor 11. In accordance with instructions from the CPU 101, the graphics processor 104 displays images on the screen of the monitor 11. The input interface 105 is connected with a keyboard 12 and a mouse 13. The input interface 105 sends signals from the keyboard 12 and the mouse 13 to the CPU 101 via the bus 107.

The communication interface 106 is connected to the Internet 10 and exchanges data with other clients through the Internet 10.

The processing function of the client 100 of the first embodiment can be implemented by the hardware configuration described above. Although FIG. 3 exemplifies the hardware configuration of the client 100, the hardware of the other clients 100a, 410, 420, firewall 210, relay computer 300, TN connection gateway 220 and host 230 may be configured in a similar manner.

The system shown in FIG. 2 is designed to perform host linkage processing between the host 230, which is within the main network 30 protected by the firewall 210, and the client 100, 100a, 410, 420 outside the main network 30. On the other hand, HTTP is a protocol wherein a process is completed as soon as a request from the client 100, 100a, 410, 420 is responded to. Namely, the HTTP request-receiving side (Web server) does not transmit data to the client 100, 100a, 410, 420 unless it receives a request from the client 100, 100a, 410, 420. With ordinary means, therefore, it is not possible to carry out real-time two-way communications by means of HTTP.

The host linkage process is a process wherein either the terminal side or the host 230 can initiate communication at random timing. Accordingly, in the first embodiment, the host linkage processing by means of HTTP is accomplished by functions described below.

Figure 4:
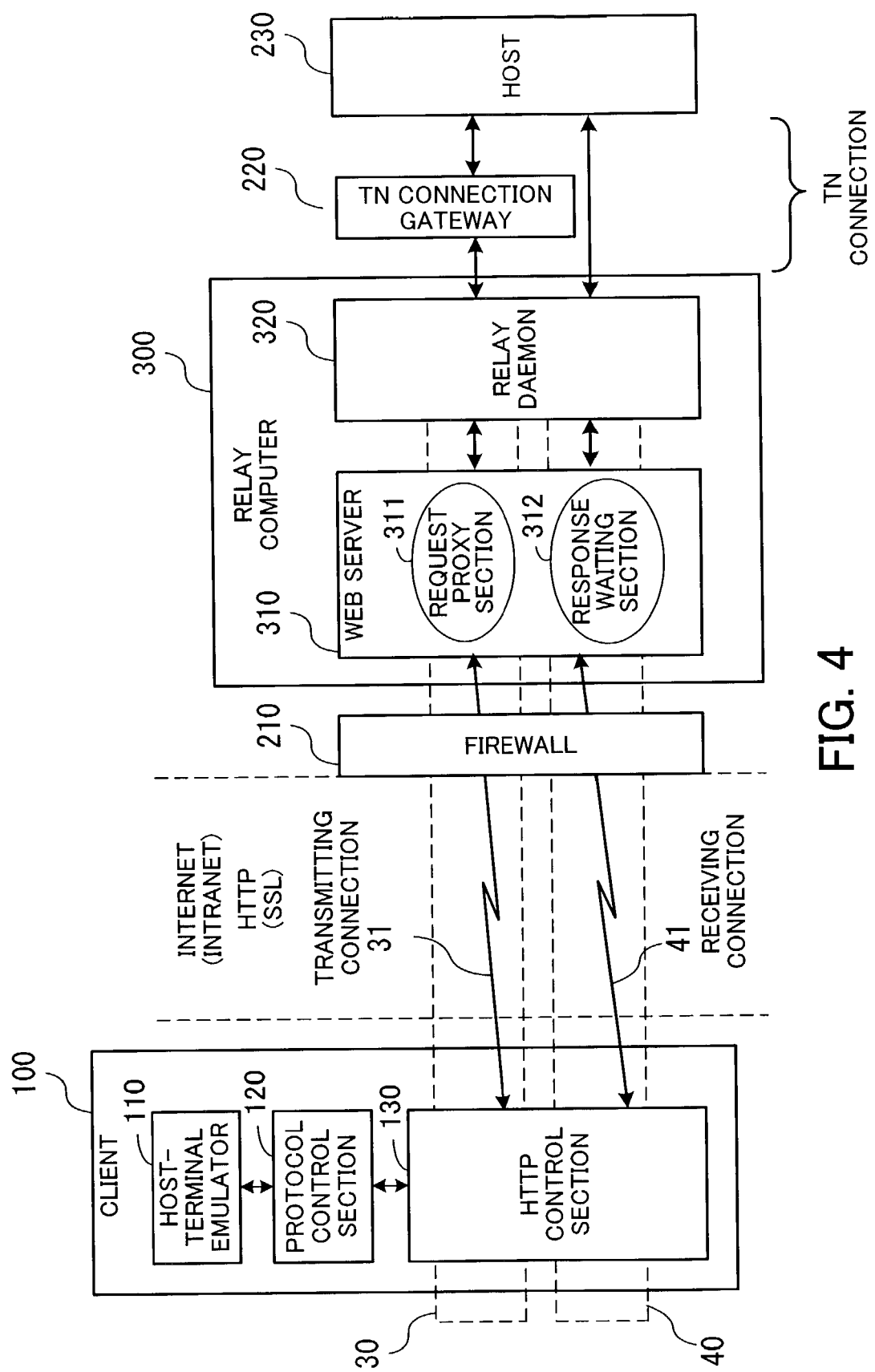
FIG. 4 is a block diagram illustrating functions necessary for host linkage processing.

FIG. 4 is a block diagram illustrating the functions necessary for the host linkage processing. As shown in FIG. 4, the client 100 has a host-terminal emulator 110, a protocol control section 120, and an HTTP control section 130. The relay computer 300 has a Web server 310 and a relay daemon 320.

The host-terminal emulator 110 within the client 100 functions as a terminal of the host 230. Specifically, the host-terminal emulator 110 detects the user's input operation on the keyboard 12 and the mouse 13, and passes input data corresponding to the input operation on to the protocol control section 120 by means of TN protocol. Also, on receiving TN protocol-compliant data (e.g., character codes) for screen display from the protocol control section 120, the host-terminal emulator 110 displays information corresponding to the received data (e.g., characters corresponding to the character codes) on the monitor 11 of the client 100.

Further, immediately after the start, the host-terminal emulator 110 supplies TN protocol-compliant data (receive request) to the protocol control section 120 to instruct the relay computer 300 to wait for reception of data from the host. Also, after receiving a response to the receive request, the host-terminal emulator 110 again sends a TN protocol-compliant receive request to the protocol control section 120.

The protocol control section 120 performs protocol conversion of data to be exchanged between the host-terminal emulator 110 and the HTTP control section 130. Specifically, the protocol control section 120 converts input data from the host-terminal emulator 110 to HTTP-compliant data (HTTP request) and passes the converted data on to the HTTP control section 130. Also, on receiving HTTP-compliant data (HTTP response) from the HTTP control section 130, the protocol control section 120 converts the received data to data (e.g., character codes) displayable by the host-terminal emulator 110, and passes the converted data on to the host-terminal emulator 110.

The HTTP control section 130 communicates with the relay computer 300 by means of HTTP. Specifically, the HTTP control section 130 transmits the HTTP request received from the protocol control section 120 to the relay computer 300 via the Internet 10. Also, the HTTP control section 130 receives an HTTP response from the relay computer 300 via the Internet 10, and passes the HTTP response on to the protocol control section 120.

The Web server 310 within the relay computer 300 is a server for providing Web page browsing service. The Web server 310 has an HTTP communication function so as to accept a Web page browse request and to deliver contents constituting a Web page. In the first embodiment, the HTTP communication function of the Web server 310 is utilized to exchange the HTTP request and response between the relay computer 300 and the client 100.

Also, the Web server 310 has a request proxy section 311 and a response waiting section 312 as its expanded functions.

The request proxy section 311 is started when supplied with an HTTP request. The request proxy section 311 thus started passes the content of data included in the HTTP request on to the relay daemon 320. The request proxy section 311 thereafter waits for a response from the host 230. On receiving data as a result notification from the host 230 via the relay daemon, the request proxy section 311 sends the result notification to the client 100 as an HTTP response.

The response waiting section 312 is started when supplied with a receive request as an HTTP request. The response waiting section 312 thus started waits for a response from the host 230. On receiving a result notification from the relay daemon 320 as a result of execution of processing by the host 230, the response waiting section 312 generates an HTTP response to the receive request, based on the result notification, and transmits the HTTP response to the client 100.

The request proxy section 311 and the response waiting section 312 can be implemented by a common program. For example, the processing functions of the request proxy section 311 and response waiting section 312 are defined in a program which is described in compliance with ISAPI (Internet Server Application Program Interface), and the execution of the program is specified in an HTTP request. In this case, in the HTTP request is included a parameter that specifies whether the function of the request proxy section 311 or the response waiting section 312 is to be started. This enables the relay computer 300 to perform the expanded function (the request proxy section 311 or the response waiting section 312) in accordance with the HTTP request.

The relay daemon 320 relays data exchanged between the Web server 310 and the host 230. In the first embodiment, data is exchanged between the relay computer 300 and the host 230 by means of TN protocol.

In this case, input/output data may be exchanged between the relay computer 300 and the host 230 directly by means of TN protocol or via the TN connection gateway 220. In the case where data is input/output via the TN connection gateway 220, the relay daemon 320 converts the data received from the Web server 310 to TN protocol-compliant data, and passes the converted data on to the TN connection gateway 220. A result notification, which is output from the host 230 in response to the data input thereto, is transmitted from the host 230 to the relay daemon 320 via the TN connection gateway 220.

On receiving the result notification from the host 230, the relay daemon 320 passes the result notification on to the Web server 310.

In the system configured as described above, two communication paths 30 and 40 are established between the client 100 and the relay computer 300. In FIG. 4, the communication paths 30 and 40 are indicated by dashed-line rectangles. The communication path 30 is a path through which the client 100 transmits data to the host 230, while the communication path 40 is a path through which the client 100 receives data from the host 230.

When communication is performed via the data transmission path 30, a transmitting connection 31 is established between the client 100 and the relay computer 300. The transmitting connection 31 is established when the HTTP control section 130 sends an HTTP request to the Web server 310 to request entry of data to the host 230 and remains established until an HTTP response to the HTTP request is returned.

On the other hand, when communication is performed via the data reception path 40, a receiving connection 41 is established between the client 100 and the relay computer 300. The receiving connection 41 is established when the HTTP control section 130 sends a receive request as an HTTP request to the Web server 310 and remains established until an HTTP response to the HTTP request is returned. When the HTTP response is returned, however, the next receive request is immediately sent out as an HTTP request. Accordingly, the receiving connection 41 remains established virtually all the time, though the connection is momentarily cut off in the middle. The fact that the receiving connection 41 is established virtually all the time means that whenever data is output from the host 230, it can be transmitted to the client 100.

Security of HTTP communications between the client 100 and the relay computer 300 can be ensured by means of SSL (Secure Sockets Layer). With SSL, the Web server 310 can be authenticated by using a certificate affixed with a certification authority's signature, and moreover, the content of communication between the client 100 and the Web server 310 can be encrypted.

Details of the host linkage processing of the system shown in FIGS. 2 to 4 will be now described.

Figure 5:
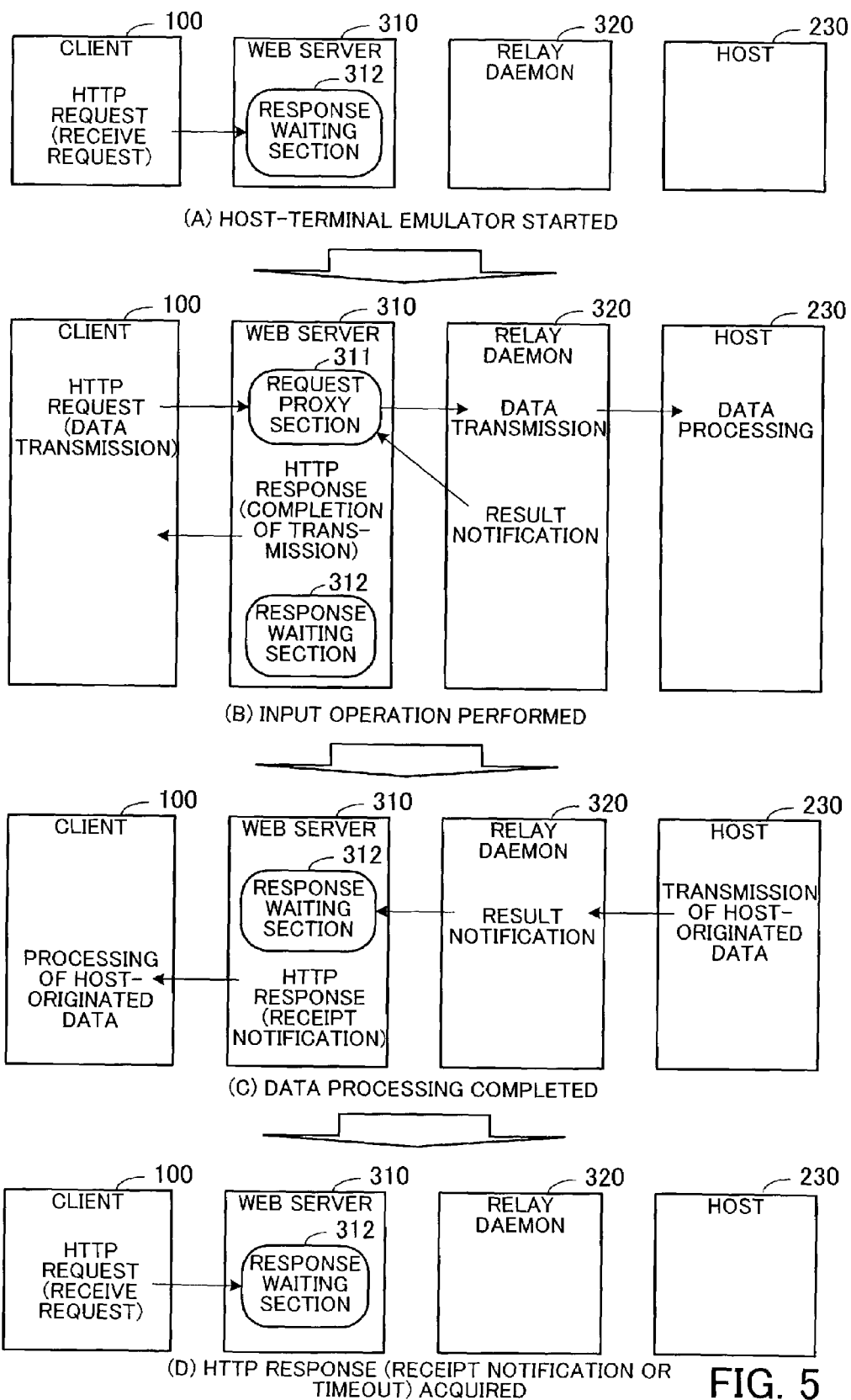
FIG. 5 is a diagram illustrating exemplary state transitions in the first embodiment, wherein part (A) of FIG. 5 shows a state at the start of a host-terminal emulator, part (B) of FIG. 5 shows a state at the time of input operation, part (C) of FIG. 5 shows a state at the time of completion of data processing, and part (D) of FIG. 5 shows a state at the time an HTTP response indicating a receipt notification or timeout is acquired.

FIG. 5 illustrates exemplary state transitions in the first embodiment. In FIG. 5, examples of state transitions of the client 100, Web server 310, relay daemon 320 and host 230 are shown.

Part (A) of FIG. 5 shows a state at the start of the host-terminal emulator. When the host-terminal emulator 110 is started, a receive request is transmitted from the client 100 to the Web server 310 as an HTTP request. On receiving the HTTP request, the Web server 310 starts the response waiting section 312. The response waiting section 312 thereafter waits for reception of a result notification.

The host-terminal emulator 110 is started when a request to execute a host-terminal emulation program is input to the client 100.

Part (B) of FIG. 5 shows a state at the time of input operation. When the client 100 is operated and data to be input to the host 230 (e.g., a command to be executed by the host 230) is entered, an HTTP request for data transmission is transmitted from the client 100 to the Web server 310. On receiving the HTTP request for data transmission, the Web server 310 starts the request proxy section 311 and passes data included in the HTTP request on to the request proxy section 311. The request proxy section 311 thus started passes the received data on to the relay daemon 320 to request the host 230 for interactive data input. The relay daemon 320 converts the received data into TN protocol data format, and transmits the converted data to the host 230 via the TN connection gateway 220. Thereupon, the host 230 executes data processing in accordance with the received data. If the received data is a command to copy a file, for example, the host 230 makes a copy of the file.

Also, the relay daemon 320 sends a result notification indicating completion of data transmission to the request proxy section 311. Thereupon, the request proxy section 311 passes the received result notification on to the Web server 310 and terminates (stops its function). The Web server 310 transmits data indicating completion of transmission, received from the request proxy section 311, to the client 100 as an HTTP response.

At this time, the response waiting section 312 is still waiting for reception of a response.

Part (C) of FIG. 5 shows a state at the time of completion of data processing. When data processing by the host 230 is completed, the host 230 transmits data (host-originated data) indicating the processing result to the relay daemon 320. If, for example, file copying has been performed by the host 230, a message indicating normal completion of copying or the like is transmitted from the host 230 to the relay daemon 320.

On receiving the host-originated data, the relay daemon 320 passes the host-originated data on to the response waiting section 312 as a result notification. Thereupon, the response waiting section 312 passes the result notification on to the Web server 310 and terminates (stops its function). The Web server 310 transmits data including the host-originated data to the client 100 as a receipt notification HTTP response. The client 100 processes the host-originated data, for example, displays the host-originated data on the screen.

Part (D) of FIG. 5 shows a state at the time an HTTP response indicating a receipt notification or timeout has been acquired. The client 100, which has received a receipt notification or timeout as an HTTP response, transmits a receive request to the Web server 310 as an HTTP request. On receiving the HTTP request, the Web server 310 starts the response waiting section 312, which thereafter waits for reception of a result notification.

In this manner, the response waiting section 312 within the Web server 310 keeps waiting for reception of data from the host 230, so that host-originated data transmitted from the host 230 at random timing can be immediately passed on to the client 100.

The following describes process flows at the time of data transmission from the client 100 and data reception by the client 100.

Figure 6:
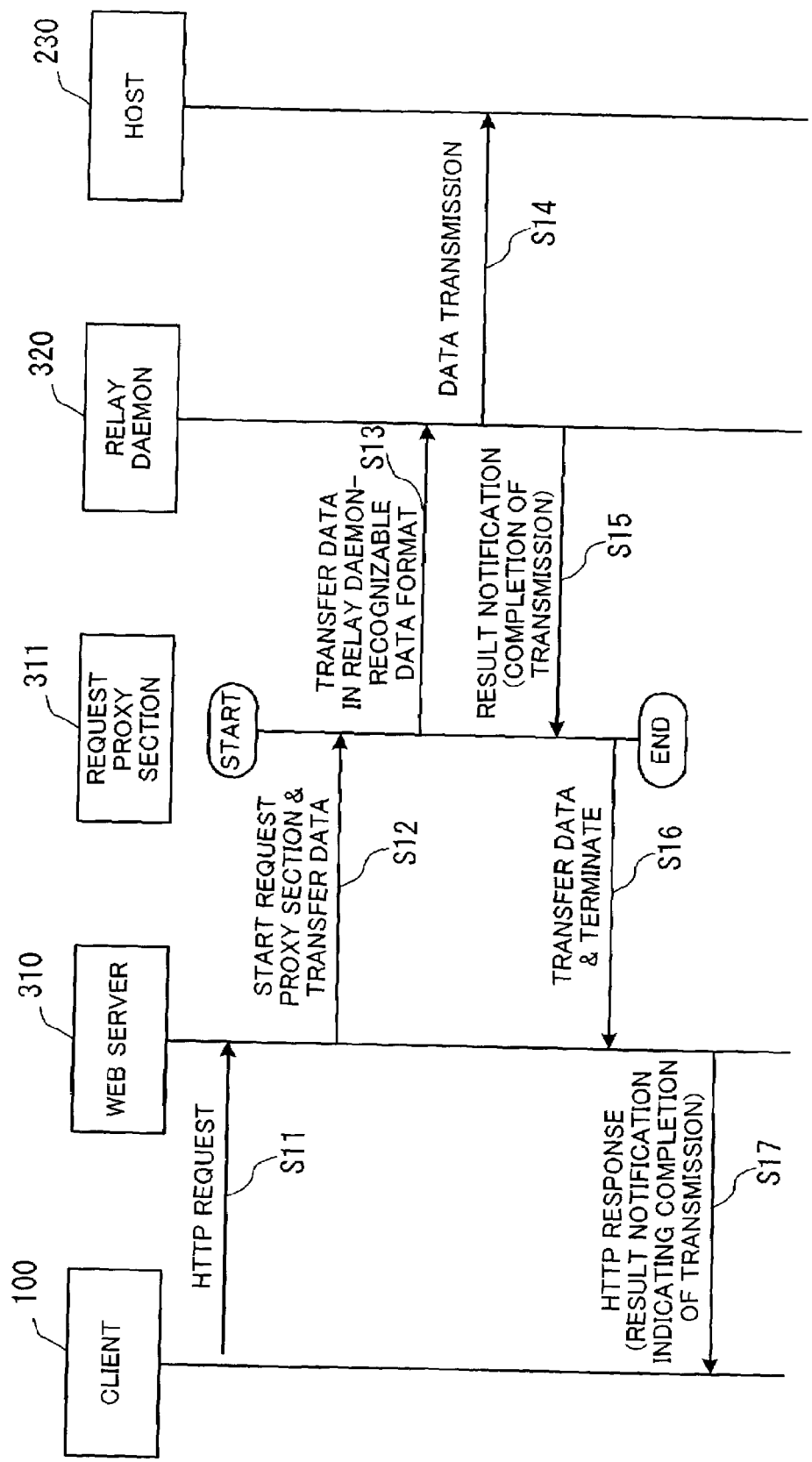
FIG. 6 is a sequence diagram illustrating a flow of data transmitted from the client to a host.

FIG. 6 is a sequence diagram illustrating a flow of data transmitted from the client to the host. In FIG. 6, the firewall 210 and the TN connection gateway 220 are omitted.

In response to the user's input operation, the client 100 transmits an HTTP request to the Web server 310 (Step S11). The Web server 310 starts the request proxy section 311 in response to the HTTP request, and passes data included in the HTTP request on to the thus-started request proxy section 311 (Step S12). The request proxy section 311 converts the received data into a relay daemon-recognizable data format and passes the converted data on to the relay daemon 320 (Step S13). The relay daemon 320 converts the data received from the request proxy section 311 to TN protocol-compliant data and transmits the converted data to the host 230 (Step S14).

After transmitting the data to the host 230, the relay daemon 320 passes a result notification indicating completion of transmission on to the request proxy section 311 (Step S15). On receiving the result notification, the request proxy section 311 passes the result notification on to the Web server 310 and ends the process (Step S16). The Web server 310 transmits the result notification indicating completion of transmission, received from the request proxy section 311, to the client 100 as an HTTP response (Step S17).

In this manner, data from the client 100 can be passed on to the host 230. If, for example, the user inputs a command to the client 100, the command is passed on to the host 230, whereupon the host 230 performs data processing in accordance with the command.

The HTTP request transmitted from the client 100 to the Web server 310 includes at least a request to start the request proxy section 311 and data to be transferred to the host 230.

Figure 7:
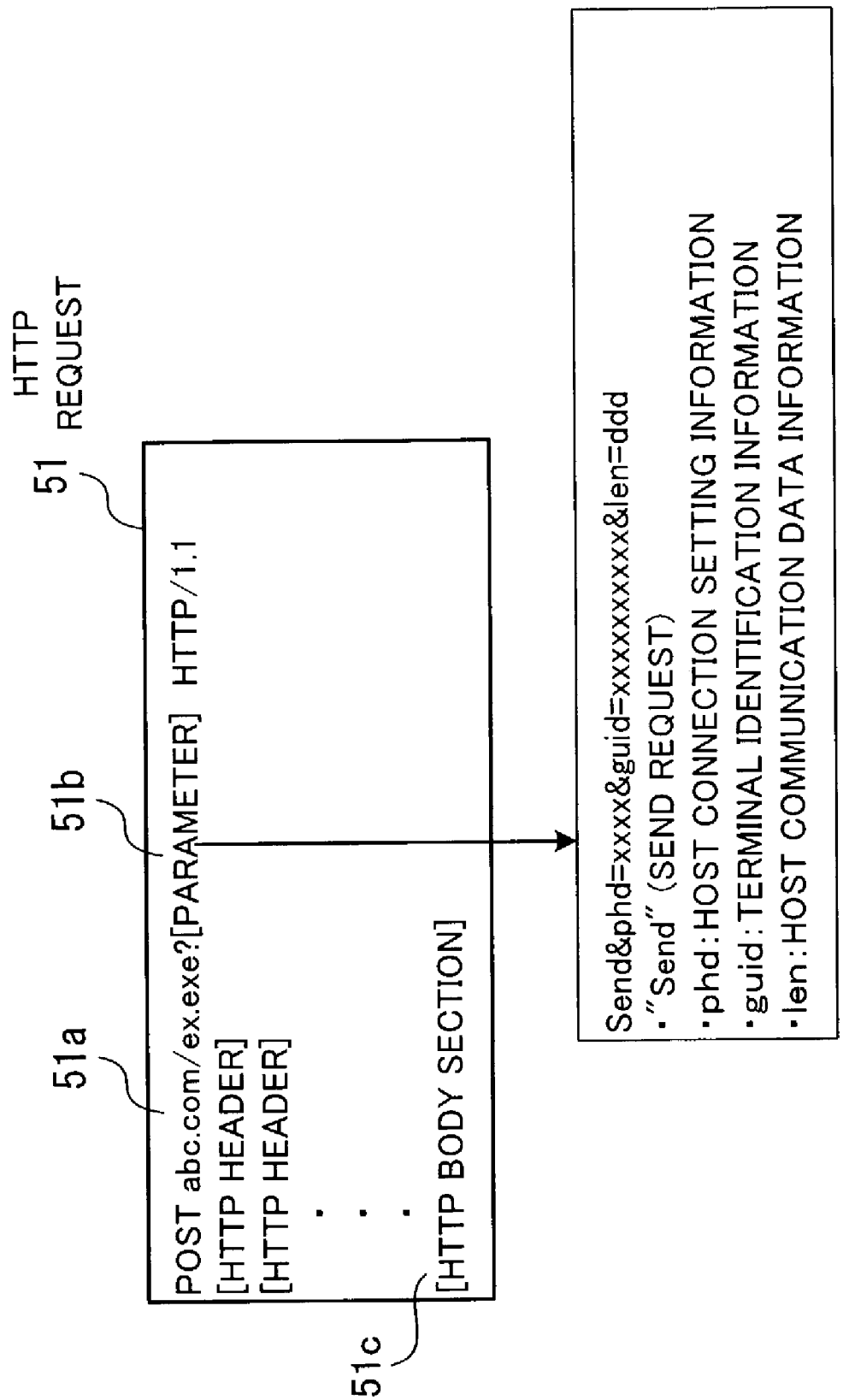
FIG. 7 is a diagram illustrating an exemplary data structure of an HTTP request for data transmission.

FIG. 7 illustrates an exemplary data structure of the HTTP request for data transmission. In FIG. 7 is shown an example of HTTP request 51 which is used in the case where the POST method is employed.

The HTTP request 51 can be divided into a URI (Uniform Resource Identifiers) section (relative path section 51a and a parameter section 51b connected by "?" following the relative path section 51a) and an HTTP body section 51c.

The relative path section 51a of the URI section has set therein the relative path of a program in which the process of the request proxy section 311 is described. In the example shown in FIG. 7, "abc.com/ex.exe" is set in the relative path section 51a of the URI section.

In the parameter section 51b and the HTTP body section 51c, data to be passed on to the started request proxy section 311 is set. The data includes "send" (indicating that this request is a send request), "phd" (host connection setting information), "guid" (terminal identification information), "len" (host communication data information), etc.

The process for transmitting data from the host 230 to the client 100 will be now described.

First, a technical problem that needs to be solved to permit data to be transmitted from the host 230 to the client 100 will be explained, prior to the description of the process for data transmission from the host 230 to the client 100.

In host-centralized processing systems in general, communication performed between a terminal and the host is asynchronous two-way communication. Accordingly, protocol for achieving host linkage communication should be able to process two-way communication that occurs at random timing. However, the HTTP communication protocol used between an HTTP client and a Web server follows a procedure wherein it is always the Web server that responds to a request from the client side. Thus, as far as the procedure is used in the ordinary way, it is not possible to transmit communication data generated by the host at random timing to the client side.

In the first embodiment, therefore, the response waiting section 312 which waits for host-originated communication is provided as an expanded function of the Web server 310. This permits communication data originated from the host at random timing to be transmitted to the terminal side with the use of an ordinary Web server.

Specifically, the receiving connection is established in advance (before the host 230 issues a request for data transmission) between the client 100 and the Web server 310. The receiving connection is a connection by means of which the client 100 waits for data to arrive from the host 230. Between the client 100 and the Web server 310, one or more receiving connections are established all the time to constantly wait for data. One receiving connection is cut off when communication data is transmitted to the client 100 from the host 230; however, since a receiving connection is again established immediately thereafter, the data wait state is maintained.

Figure 8:
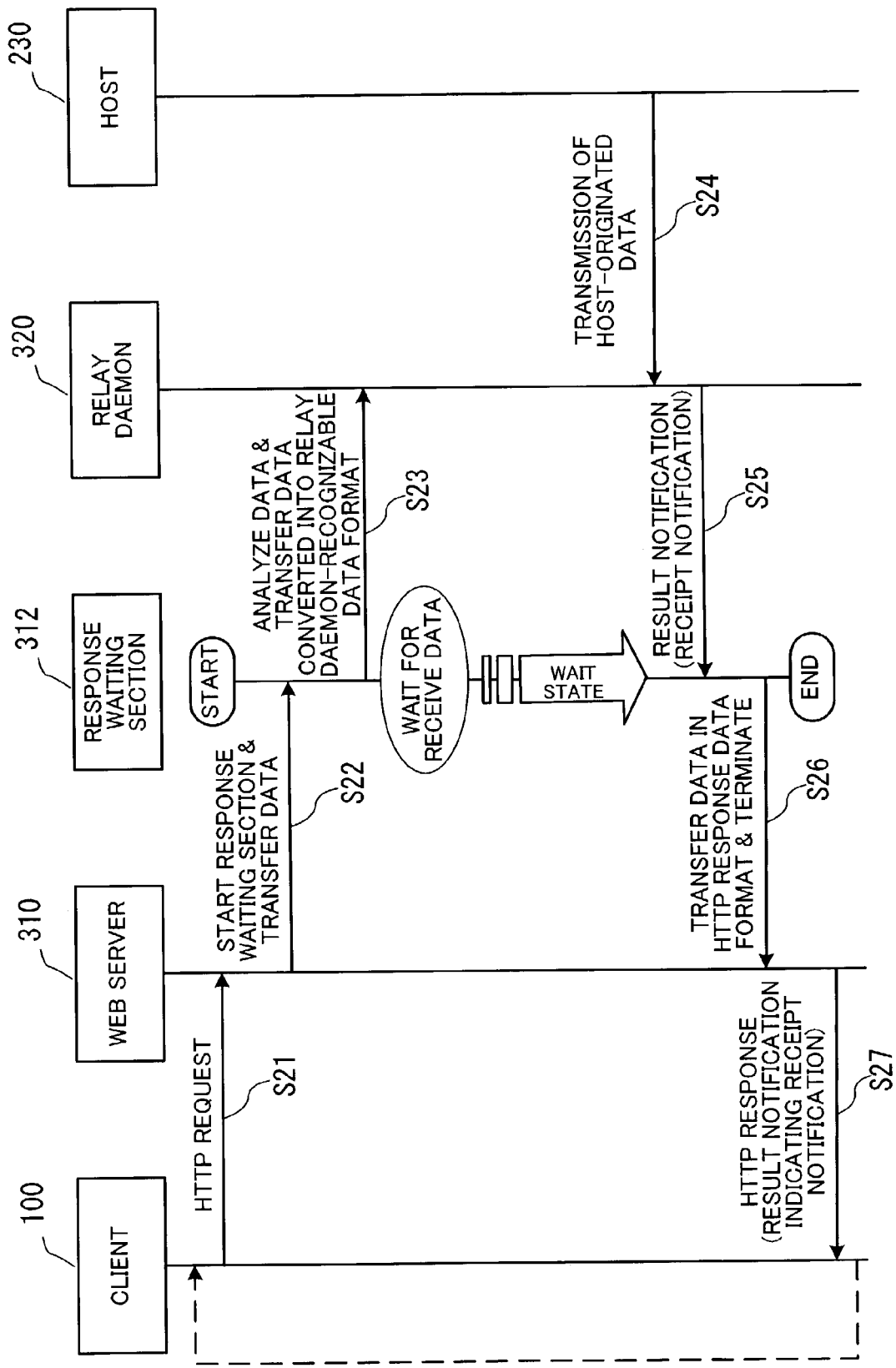
FIG. 8 is a sequence diagram illustrating a process flow for receiving host-originated data at the client.

FIG. 8 is a sequence diagram illustrating the flow of a process for receiving host-originated data by the client. In FIG. 8, the firewall 210 and the TN connection gateway 220 are omitted.

Upon start of the host-terminal emulator 110, the client 100 transmits a receive request to the Web server 310 as an HTTP request (Step S21). As a consequence, a data receiving connection is established between the client 100 and the Web server 310. Thereupon, the Web server 310 starts the response waiting section 312 and passes the data on to the thus-started response waiting section 312 (Step S22). The response waiting section 312 analyzes the data and converts the data into the relay daemon-recognizable data format. Then, the response waiting section 312 passes the data thus converted into the relay daemon-recognizable data format on to the relay daemon 320 (Step S23). The response waiting section 312 thereafter keeps waiting for receive data.

After executing a process of which the result should be provided to the client 100, the host 230 transmits the data (host-originated data) to the relay daemon 320 (Step S24). On receiving the host-originated data, the relay daemon 320 passes a result notification indicating reception of the data on to the response waiting section 312 (Step S25). The response waiting section 312 converts the host-originated data included in the received result notification to an HTTP response of HTTP format, and passes the response on to the Web server 310 (Step S26). Then, the process of the response waiting section 312 is ended. The Web server 310 transmits the HTTP response indicating reception of the host-originated data to the client 100 (Step S27). Thereupon, the client 100 again transmits a receive request to the Web server 310 as an HTTP request (Step S21). This causes a data receiving connection to be again established between the client 100 and the Web server 310, so that the response waiting section 312 is brought to a wait state.

In this manner, data from the host 230 can be transferred to the client 100 at random timing. For example, on completion of a process by the host 230 in response to a command received from the client 100, a message indicating completion of the process is transmitted from the host 230 to the client 100.

The HTTP request for data reception transmitted from the client 100 to the Web server 310 includes at least a request to start the response waiting section 312.

Figure 9:
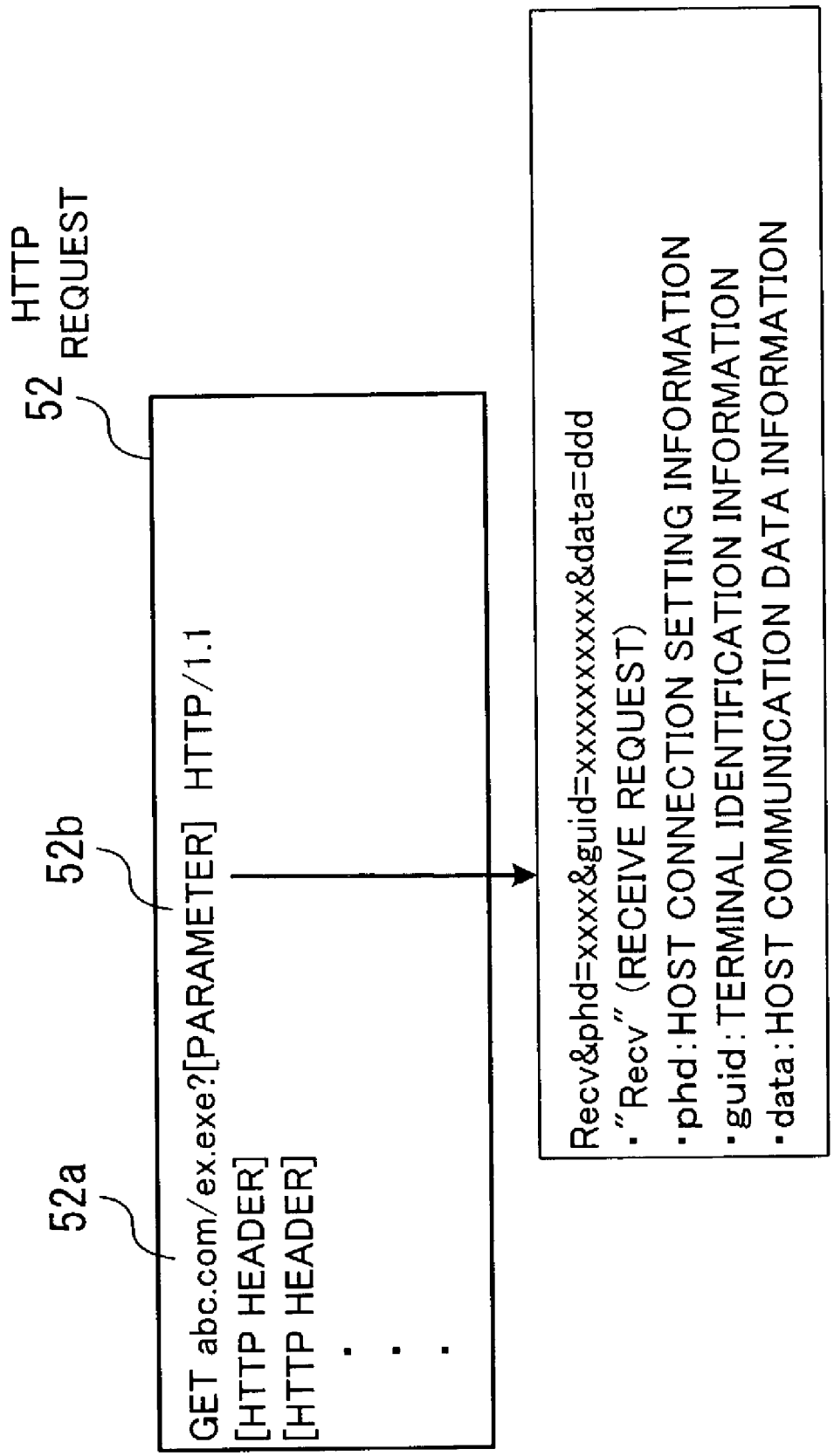
FIG. 9 is a diagram illustrating an exemplary data structure of an HTTP request for data reception.

FIG. 9 illustrates an exemplary data structure of the HTTP request for data reception. In FIG. 9 is shown an example of HTTP request 52 which is used in the case where the GET method is employed.

The HTTP request 52 can be divided into a program relative path section 52a and a parameter section 52b.

The relative path section 52a has set therein the relative path of a program in which the process of the response waiting section 312 is described. In the example shown in FIG. 9, "abc.com/ex.exe" is set in the relative path section 52a.

In the parameter section 52b, data to be passed on to the started response waiting section 312 is set. The parameter section 52b follows "?" at the end of the relative path section 52a. The parameter section 52b includes data such as "Recv" (indicating that this request is a receive request), "phd" (host connection setting information) and "guid" (terminal identification information).

Processes performed inside the client 100 and the relay computer 300 will be now described.

Figure 10:
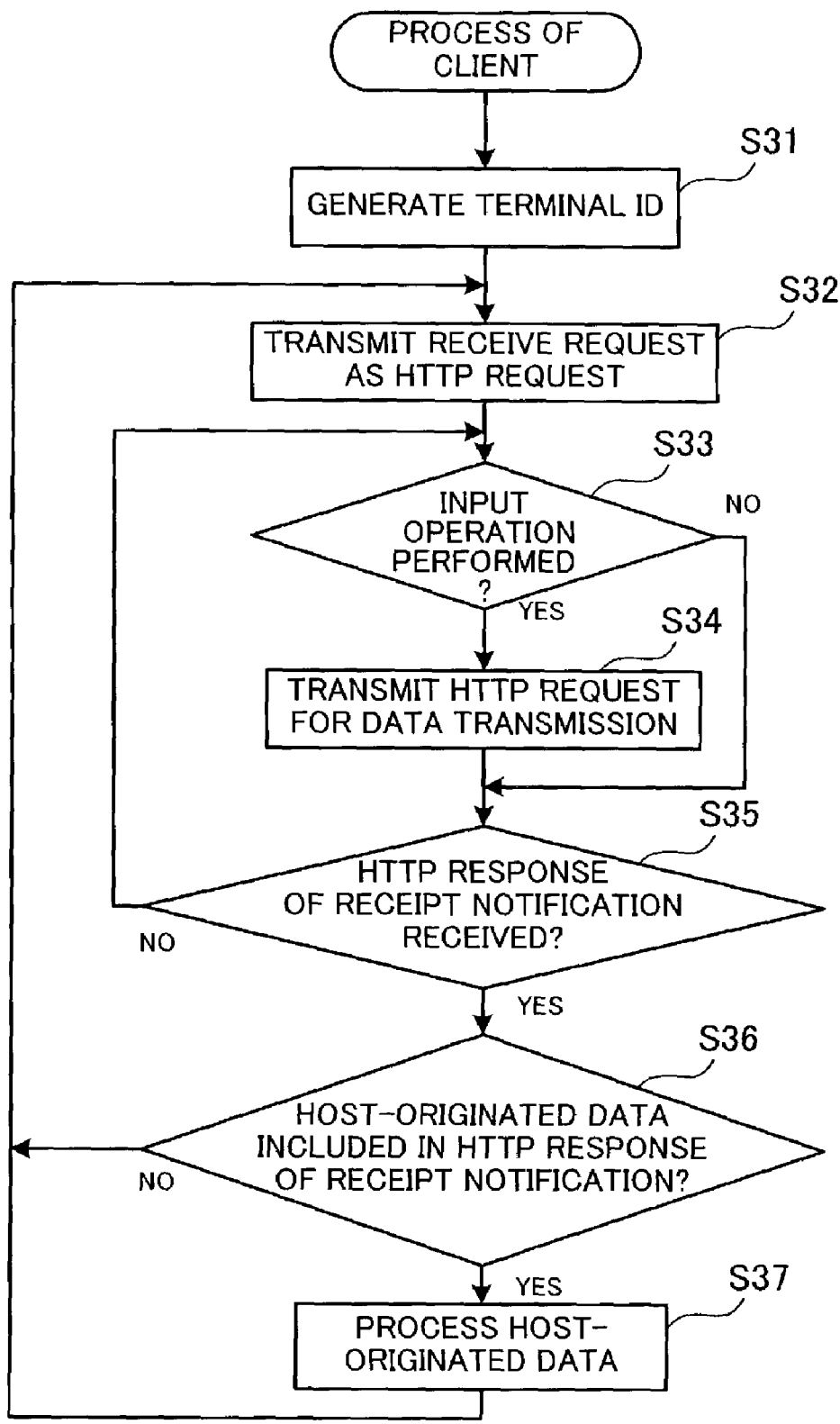
FIG. 10 is a flowchart illustrating a process executed by the client.

FIG. 10 is a flowchart illustrating a procedure for the process executed in the client. The process shown in FIG. 10 is started when the host-terminal emulator 110 is started. In the following, the process of FIG. 10 will be explained in order of step number.

[Step S31] The client 100 generates terminal identification information (terminal ID) by which the host can uniquely identify the terminal. For such a uniquely identifiable ID, hardware address of Ethernet (registered trademark) may be used, for example.

Alternatively, the terminal ID may be acquired from the relay computer 300. In this case, the relay computer 300 generates terminal identification information for uniquely identifying the client 100, and notifies the client 100 of the generated information. The client 100 retains the terminal identification information thus notified and reads out the information when executing Step S31.

[Step S32] The client 100 transmits a receive request to the relay computer 300 as an HTTP request. Specifically, the host-terminal emulator 110 passes the receive request data on to the protocol control section 120. The protocol control section 120 converts the data to HTTP-compliant data and transfers the converted data to the HTTP control section 130, whereupon the HTTP control section 130 transmits the received data via the Internet 10 to the relay computer 300 as an HTTP request. The HTTP request includes the terminal identification information.

[Step S33] The client 100 determines whether or not an input operation has been performed. The input operation referred to herein denotes an input operation performed with respect to the started host-terminal emulator 110. If such an input operation has been performed, the process proceeds to Step S34; if not, the process proceeds to Step S35.

[Step S34] The client 100 transmits an HTTP request for data transmission to the relay computer 300. Specifically, the host-terminal emulator 110 passes the data entered by the input operation on to the protocol control section 120. The protocol control section 120 converts the received data to HTTP format data, and passes the converted data on to the HTTP control section 130. The HTTP control section 130 transmits the received data to the relay computer 300 as an HTTP request for data transmission.

[Step S35] The host-terminal emulator 110 of the client 100 determines whether or not an HTTP response of receipt notification has been received. If such an HTTP response has been received, the process proceeds to Step S36; if not, the process proceeds to Step S33.

[Step S36] The host-terminal emulator 110 of the client 100 determines whether or not the HTTP response of receipt notification includes host-originated data. Where no host-originated data is included, then the response is a receipt notification indicating timeout. If host-originated data is included, the process proceeds to Step S37; if not, the process proceeds to Step S32.

[Step S37] The host-terminal emulator 110 of the client 100 processes the host-originated data. For example, the host-terminal emulator 110 displays the host-originated data on the monitor 11. The process then proceeds to Step S32.

The process executed in the relay computer 300 will be now described.

Figure 11:
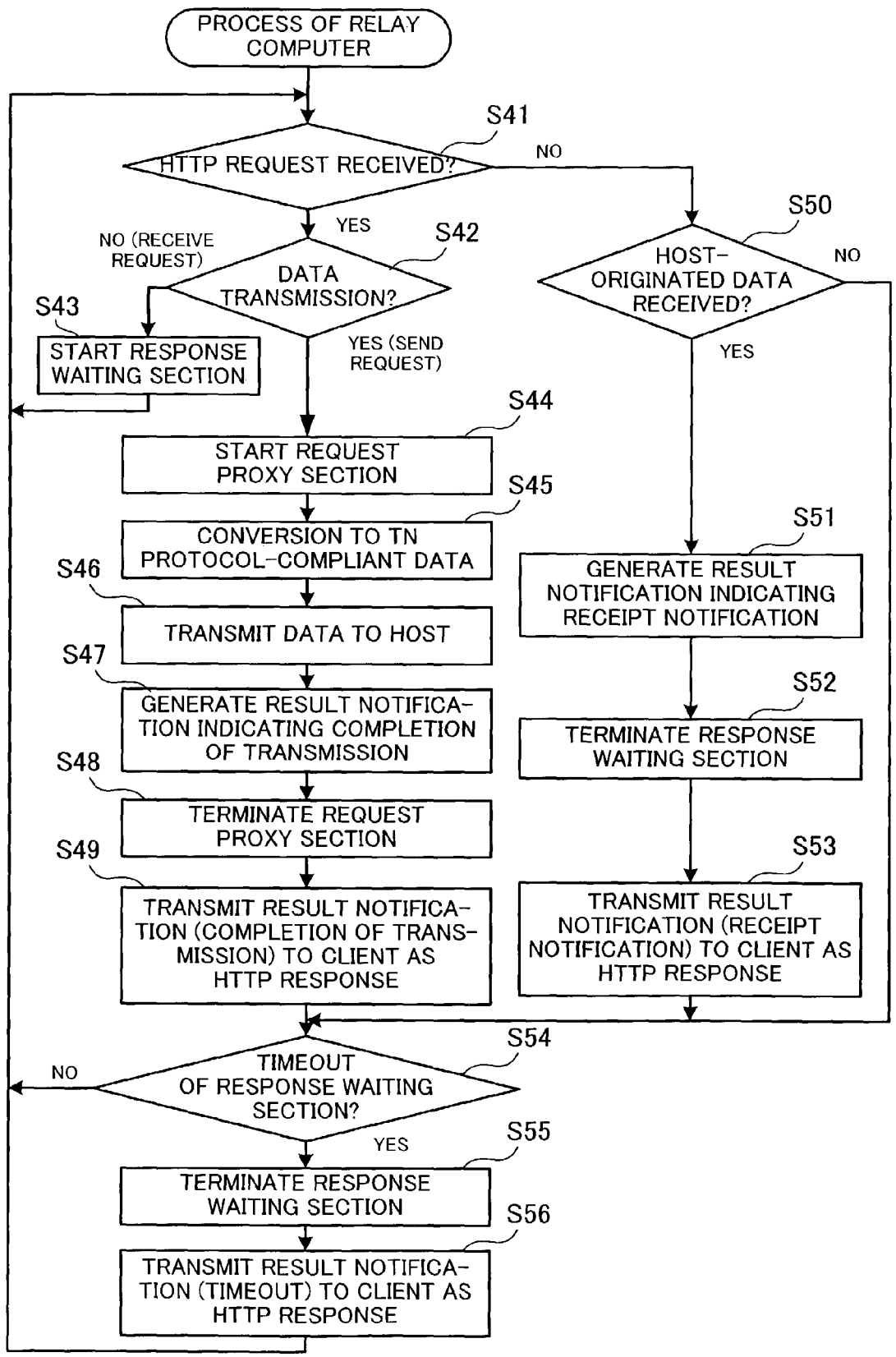
FIG. 11 is a flowchart illustrating a process executed by a relay computer.

FIG. 11 is a flowchart illustrating a procedure for the process executed in the relay computer. In the following, the process shown in FIG. 11 will be explained in order of step number.

[Step S41] The Web server 310 determines whether or not an HTTP request has been received. If an HTTP request has been received, the process proceeds to Step S42; if not, the process proceeds to Step S50.

[Step S42] The Web server 310 determines whether the received HTTP request is an HTTP request for data transmission or an HTTP request for data reception. If, for example, the send request (Send) is included as a parameter, as in the HTTP request 51 shown in FIG. 7, the received HTTP request is a request for data transmission. On the other hand, if the receive request (Recv) is included as a parameter, as in the HTTP request 52 shown in FIG. 9, then the received HTTP request is a request for data reception. If the received request is a request for transmission, the process proceeds to Step S44; if the received request is a request for reception, the process proceeds to Step S43.

[Step S43] The Web server 310 starts the response waiting section 312.

[Step S44] The Web server 310 starts the request proxy section 311 and passes the data included in the HTTP request for transmission on to the request proxy section 311. Thereupon, the request proxy section 311 passes the data received from the Web server 310 on to the relay daemon 320 and requests the same to transmit the data to the host 230.

[Step S45] The relay daemon 320 converts the data received from the request proxy section 311 to TN protocol-compliant data.

[Step S46] The relay daemon 320 transmits the TN protocol-compliant data to the host 230 via the TN connection gateway 220.

[Step S47] The relay daemon 320 generates a result notification indicating completion of transmission, and passes the result notification on to the request proxy section 311.

[Step S48] The request proxy section 311 passes the result notification indicating completion of transmission on to the Web server 310 and terminates.

[Step S49] The Web server 310 transmits the result notification indicating completion of transmission to the client 100 as an HTTP response. The process then proceeds to Step S54.

[Step S50] The relay daemon 320 determines whether or not host-originated data has been received. If host-originated data has been received, the process proceeds to Step S51; if not, the process proceeds to Step S54.

[Step S51] The relay daemon 320 generates a result notification indicating receipt notification and passes the result notification on to the response waiting section 312.

[Step S52] The response waiting section 312 passes the receipt notification thus received on to the Web server 310 and terminates.

[Step S53] The Web server 310 transmits the result notification indicating the receipt notification to the client 100 as an HTTP response. The process then proceeds to Step S54.

[Step S54] The Web server 310 determines whether or not the waiting time of the response waiting section 312 has become out (reached a predetermined maximum waiting time). If the time is out, the process proceeds to Step S55; if not, the process proceeds to Step S41.

[Step S55] The Web server 310 terminates the response waiting section 312.

[Step S56] The Web server 310 transmits a result notification indicating the timeout to the client 100 as an HTTP response. The process then proceeds to Step S41.

The processes described above provide the following advantages:

High-security host linkage communication is ensured.

Since host linkage communication is performed by means of HTTP protocol, communication with the host can be carried out via the Internet/intranet without relaxing the network security policy for the firewall etc. (e.g. without the need to admit the TN protocol connection).

The resources of existing host communication functions can be used as they are.

Communication with the host by means of HTTP protocol is a novel form of host connection that was not implemented before, but since the host communication is achieved with the use of the relay function for interfacing between an existing host communication protocol (TN protocol etc.) and HTTP protocol, existing communication resources such as the gateway for host communication can be used as they are.

An existing Web server and its functions can be utilized.

An HTTP protocol communication process needs to be performed between the client and the relay computer, but in this embodiment, this is achieved by an ordinary Web server and the function of its extended program (CGI (Common Gateway Interface) etc.), thus making it unnecessary to develop the HTTP function of the relay computer side. Further, the functions of the Web server can be directly used. Thus, if the Web server used supports SSL communication, for example, then it is unnecessary to develop the SSL communication function of the server side.

In this manner, according to the first embodiment, service utilizing host-centralized processing can be provided safely through the Internet. In an HTTP-based client-server system using CGI in simple form, for example, the server is unable to transmit response data to a client unless the client makes a request. However, by using host linkage processing according to the first embodiment, it is possible for the host to transmit data to a client at desired timing. This makes it possible to provide services that could not be accomplished by conventional Internet-related techniques.

For example, an individual investor who deals in stocks may wish to sell stocks by placing a sell order immediately after the stock price rises. In the case of such a deal, if stock price information reaches the individual investor several tens of seconds after a rise in the stock price and if a third party places a sell order in the meantime, the stock price falls. Accordingly, the individual investor needs to be supplied with the stock price information immediately after stock prices change. According to the first embodiment, data can be transmitted from the host 230 to the client 100 at any desired time. Thus, when a stock price has changed, stock price data can be immediately transmitted from the host 230 to the client 100 used by an individual investor.

This enables the client to quickly acquire stock price information as soon as the stock price of a target issue has changed, so that the individual investor never misses the opportunity to sell or buy stocks.

Also, the HTTP request output from individual clients includes terminal identification information by which the host 230 can uniquely identify the respective clients, and accordingly, a plurality of clients can be individually identified at the host 230 or the relay computer 300. Even a client communicating with the host via a proxy can be distinguished from other computers at the host 230 or the relay computer 300.

[Second Embodiment]

A second embodiment will be now described. In the second embodiment, host linkage processing is carried out without using a Web server.

Figure 12:
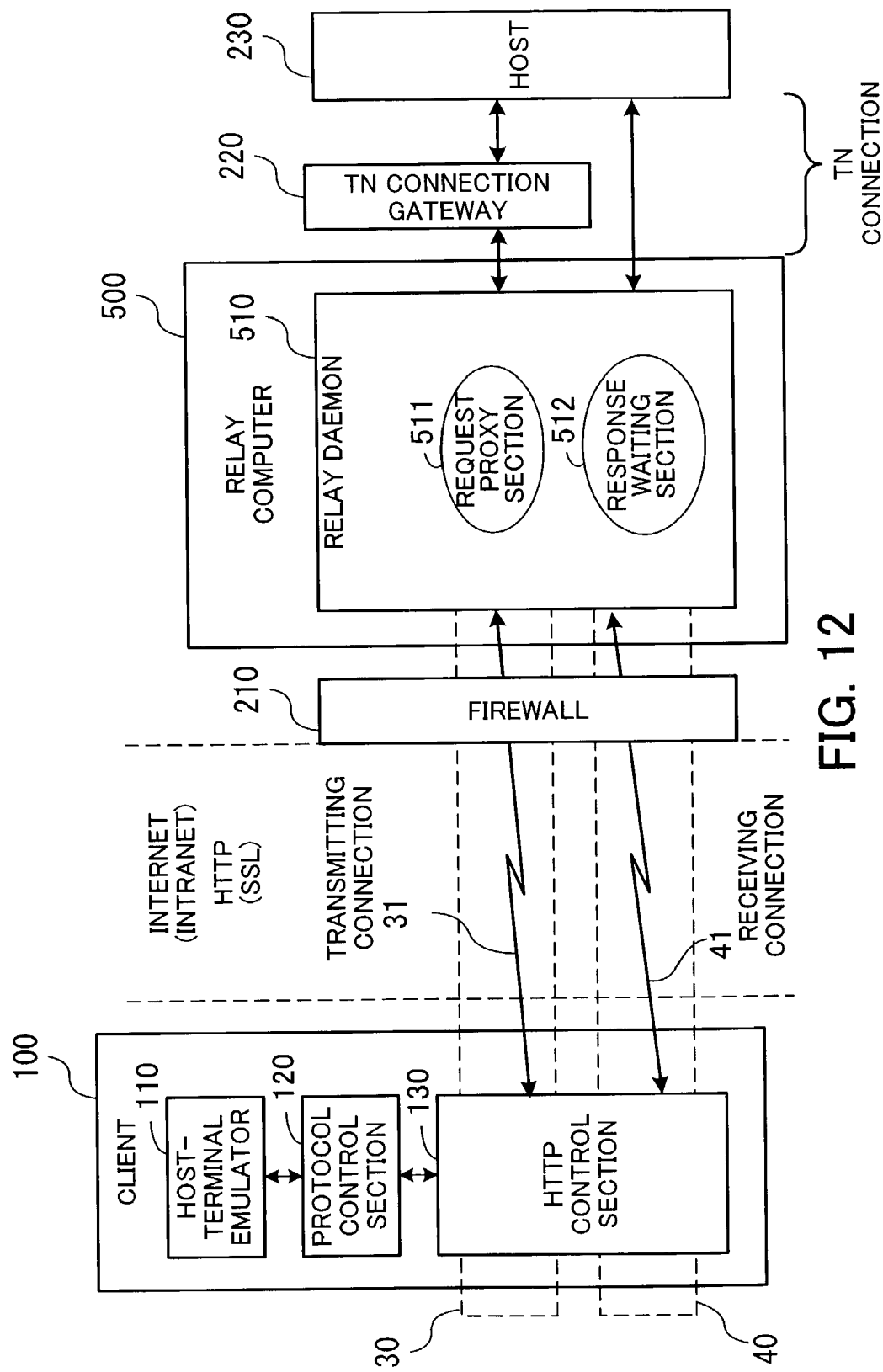
FIG. 12 is a diagram illustrating an exemplary configuration of a host linkage processing system according to a second embodiment.

FIG. 12 illustrates an exemplary configuration of a host linkage processing system according to the second embodiment. The configuration shown in FIG. 12 is identical with that of the first embodiment shown in FIG. 4 except for the configuration of a relay computer 500. In FIG. 12, therefore, identical reference numerals are used to denote elements identical with those of the first embodiment shown in FIG. 4, and description of such elements is omitted.

The relay computer 500 of the second embodiment has no Web server and a relay daemon 510 performs HTTP communications. Namely, in the first embodiment shown in FIG. 4, the relay computer 300 has the Web server 310 provided therein to make use of the HTTP communication function of the Web server 310. However, in cases where the relay daemon 510 can perform HTTP communications directly with the client 100 while protecting the data by means of SSL, as shown in FIG. 12, no Web server may be provided in the relay computer 500.

In this case, the relay daemon 510 has the functions of a request proxy section 511 and response waiting section 512 incorporated therein. The function of the request proxy section 511 is identical with that of the request proxy section 311 of the first embodiment shown in FIG. 4, and the function of the response waiting section 512 is identical with that of the response waiting section 312 of the first embodiment shown in FIG. 4.

With this system, upon start of the host-terminal emulator 110, an HTTP request indicating a response wait request is transmitted from the client 100 to the relay computer 500. Thereupon, the receiving connection 41 is established between the relay computer 500 and the client 100, and simultaneously, the response waiting section 512 is started within the relay daemon 510. Consequently, the relay daemon 510 thereafter remains in a state waiting for data from the host 230 and can receive data originated from the host 230 to the client 100 at any time.

If an input operation is performed thereafter with respect to the host-terminal emulator 110 of the client 100, the transmitting connection 31 is established between the client 100 and the relay computer 500. Then, using the transmitting connection 31, the client 100 transmits an HTTP request for data transmission to the relay computer 500. Thereupon, the request proxy section 511 is generated in the relay daemon 510 of the relay computer 500. The request proxy section 511 thus generated converts the HTTP-compliant data transmitted from the client 100 to TN protocol-compliant data, and transmits the converted data to the host 230 via the TN connection gateway 220. Simultaneously with this, the relay daemon 510 transmits an HTTP response indicating completion of transmission to the client 100, cuts off the transmitting connection, and terminates the request proxy section 511.

If, as a result of the execution of processing by the host 230, data (host-originated data) for the client 100 is output, the host-originated data is received by the relay daemon 510. The relay daemon 510 converts the host-originated data compliant to TN protocol to an HTTP-compliant receipt notification, and passes the receipt notification on to the response waiting section 512 as an HTTP response. The response waiting section 512 transmits the HTTP response indicating the receipt notification to the client 100, whereupon the process of the response waiting section 512 terminates and the receiving connection is cut off.

On receiving the HTTP response indicating the receipt notification, the client 100 displays data included in the HTTP response and also transmits a wait request to the relay computer 500 as an HTTP request. As a consequence, the receiving connection 41 is established again.

Thus, also in the second embodiment, host linkage processing can be performed between the client 100 and the host 230, as in the first embodiment. As a result, data output from the host 230 at random timing can be transmitted to the client 100 by means of HTTP communication.

[Other Examples of Application]

Figure 13:
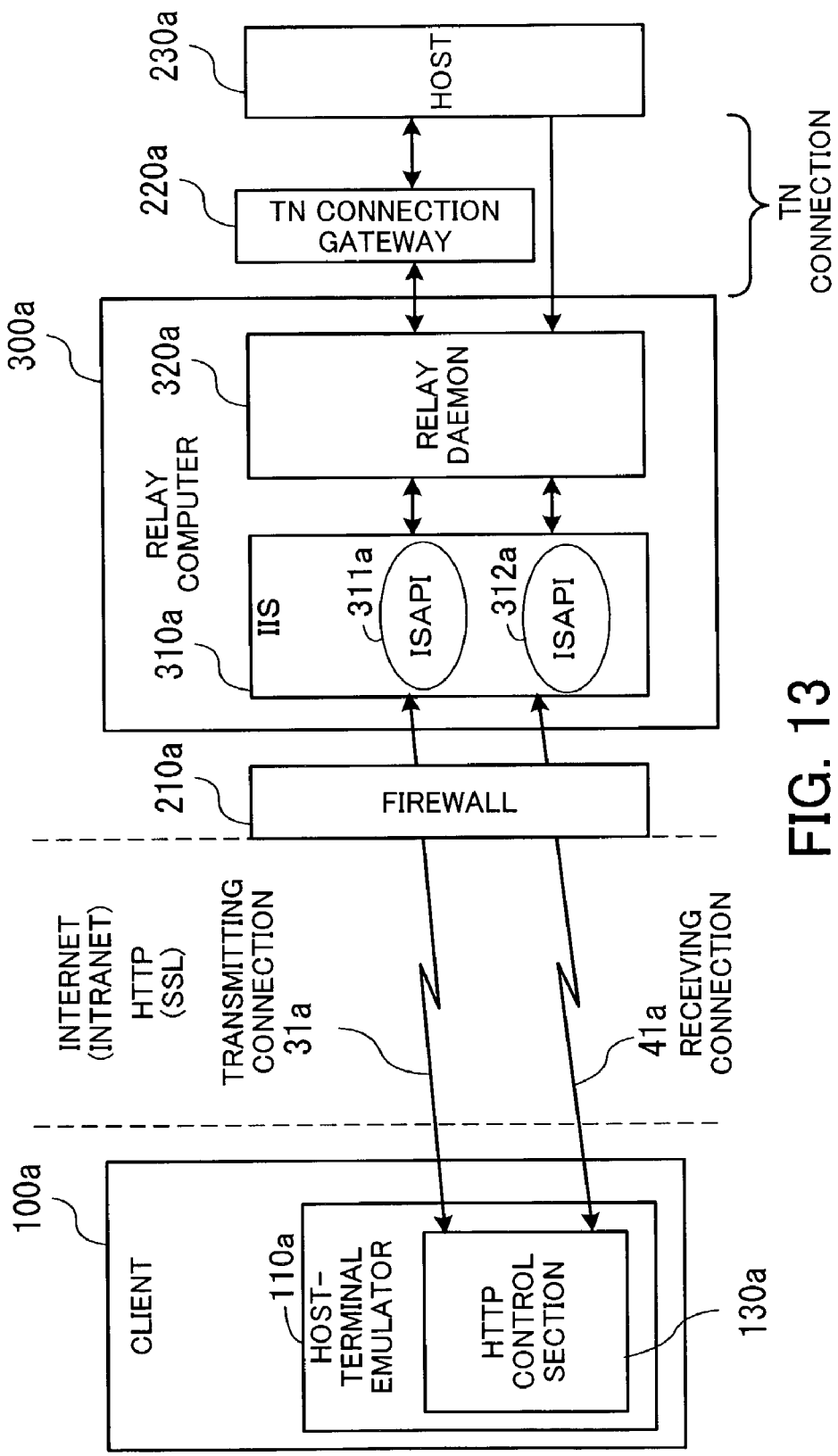
FIG. 13 is a diagram illustrating an example of incorporating a host linkage processing function in an existing networked environment.

In the case of constructing the system of the first embodiment in an existing networked environment, the system may be configured as shown in FIG. 13, for example.

FIG. 13 shows an example of incorporating the host linkage processing function in an existing networked environment.

The client 100a is a computer which is under the control of an OS designed for personal computers. The OS to be used may be Windows (registered trademark) from Microsoft Corporation, the U.S.A. In this case, using WinInet library (WinInet is an API for developing a client application with Internet access function), an HTTP control section 130a capable of SSL communication may be implemented within a host-terminal emulator 110a.

Also, as the terminal identification information for the client 100a, a globally unique ID (GUID) may be used.

A firewall 210a may be a computer which can permit/prohibit the passage of HTTP communications through the individual ports. For example, the firewall may be constructed on the UNIX (registered trademark) OS.

A relay computer 300a may be implemented by using, for example, Windows NT Server 4.0 (registered trademark) or Windows 2000 Server (registered trademark), both from Microsoft Corporation, the U.S.A. In such cases, IIS (Internet Information Service) may be used as a Web server 310a. Where the Web server 310a is constructed using IIS, the functions of a request proxy section 311a and response waiting section 312a may be implemented by ISAPI (Internet Server API) for HTTP host communication.

A relay daemon 320a can communicate with the request proxy section 311a and the response waiting section 312a, both implemented by ISAPI, via a mail slot (a means to perform process communication).

For a TN connection gateway 220a, FNA Server (registered trademark) from FUJITSU LIMITED may be used, for example.

For a host 230a, various general-purpose computers complying with protocols that permit terminal connection from a remote place, such as TN protocol, may be used.

The first and second embodiments of the present invention can be accomplished by the system configured as shown in FIG. 13.

In the foregoing description of the first and second embodiments, the host-terminal emulator 110, the protocol control section 120 and the HTTP control section 130 are explained as discrete elements, but the functions of the protocol control section 120 and HTTP control section 130 may be incorporated in the host-terminal emulator 110.

The processing functions described above can be performed by a general-purpose server computer and a client computer. In this case, a relay program is prepared in which are described processes for performing the function of the relay computer 300, and also a host-terminal emulation program is prepared in which are described processes for performing the function of the client 100. The relay program is executed by a server computer, whereupon the aforementioned processing function of the relay computer 300 is accomplished by the server computer. Also, the host-terminal emulation program is executed by a client computer, whereupon the aforementioned processing function of the client 100 is accomplished by the client computer.

The relay program and the host-terminal emulation program individually describing the required processes may be recorded on a computer-readable recording medium. The computer-readable recording medium includes magnetic recording device, optical disc, magneto-optical recording medium, semiconductor memory, etc. Such a magnetic recording device may be hard disk drive (HDD), flexible disk (FD), magnetic tape, etc. As the optical disc, DVD (Digital Versatile Disc), DVD-RAM (Random Access Memory), CD-ROM (Compact Disc Read Only Memory), CD-R (Recordable)/RW (ReWritable) or the like may be used. The magneto-optical recording medium includes MO (Magneto-Optical disc) etc.

To distribute the relay program or the host-terminal emulation program, portable recording media, such as DVD and CD-ROM, on which the program is recorded may be put on sale. Alternatively, the host-terminal emulation program may be stored in the storage device of a server computer and may be transferred from the server computer to client computers through a network.

A server computer which is to execute the relay program stores in its storage device the relay program recorded on a portable recording medium, for example. Then, the server computer loads the relay program from its storage device and performs processes in accordance with the relay program. The server computer may load the relay program directly from the portable recording medium to perform processes in accordance with the relay program.

A client computer which is to execute the host-terminal emulation program stores in its storage device the host-terminal emulation program recorded on a portable recording medium or transferred from the server computer, for example. Then, the client computer loads the host-terminal emulation program from its storage device and performs processes in accordance with the host-terminal emulation program. The client computer may load the host-terminal emulation program directly from the portable recording medium to perform processes in accordance with the host-terminal emulation program. Also, as the host-terminal emulation program is transferred from the server computer, the client computer may sequentially perform processes in accordance with the host-terminal emulation program.

Also, where the relay device is constituted by an ordinary server, a program is prepared for performing asynchronous bidirectional communication by means of a protocol which follows a communication procedure such that a server responds to a request from a client. Specifically, a server program is prepared in which are described the communications processes of the above relay program, except for the relay function, and also a communication program for a client is prepared in which are described processes for performing asynchronous bidirectional communication with the server by means of a protocol following such a communication procedure that the server responds to a request from the client. Like the relay program and the host-terminal emulation program, these programs may be recorded on portable recording media for distribution or be transferred through a network.

As described above, with the host-terminal emulation program, relay program and host-terminal emulation method according to the present invention, a receiving connection for receiving data compliant to a protocol which can pass through the gateway is established in advance with the relay device which performs host linkage processing with the host computer by means of a protocol of which the passage is blocked by the gateway, and using the receiving connection, data output from the host computer is received via the relay device. This permits access to the host computer from outside a protected network including the host computer to allow data to be input and output for host linkage processing, without lowering the security of the protected network.

Further, with the communication program, communication method and client computer according to the present invention, a receiving connection is established in advance for receiving data compliant to a protocol following a communication procedure such that the server responds to a request from a client, and using the receiving connection, data output from the server is received. Consequently, asynchronous bidirectional communication can be accomplished with the use of a protocol following such a communication procedure that the server responds to a request from the client side.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium storing a host-terminal emulation program for a computer to function as a terminal that interacts with a host computer via a firewall and a relay device, the host computer communicating with the relay device using a first protocol, the firewall permitting the terminal to reach the relay device, not by using the first protocol, but by using a second protocol, the relay device providing conversion between the first and second protocols,
wherein the host-terminal emulation program causes the computer to perform a process comprising:
establishing a new receiving connection with the relay device by using the second protocol immediately after a previous set of data is received from the relay device, regardless of whether another set of receive data is due or not due;
establishing a transmitting connection with the relay device by using the second protocol when data is to be transmitted to the host computer in response to an input operation;
transmitting, via the transmitting connection, data entered by the input operation to the relay device by means of the second protocol; and
receiving, from the relay device via the established new receiving connection, output data from the host computer by means of the second protocol.

2. The computer-readable recording medium according to claim 1, the process further comprising the step of establishing another new receiving connection with the relay device immediately upon expiration of a previously established receiving connection.

3. The computer-readable recording medium according to claim 1, wherein the second protocol is a protocol which the relay device uses to deliver contents by means of a Web server function thereof.

4. The computer-readable recording medium according to claim 1, wherein the second protocol is a protocol which permits a connection to be established and cut off each time a request and a response as a unit are performed, respectively.

5. The computer-readable recording medium according to claim 1, wherein when the receiving connection is established, a request is output to the relay device to request start of a function within the relay device to wait for reception of data from the host computer.

6. The computer-readable recording medium according to claim 1, wherein the computer generates identification information by which the computer can be uniquely identified on a network or receives the identification information generated by the relay device, and when the transmitting connection and the receiving connection are established with the relay device, the computer transmits a connection request including the identification information to the relay device.

7. A host-terminal emulation method for transferring data through a terminal that is connected to a host computer via a firewall and a relay device, the host computer communicating with the relay device using a first protocol, the firewall permitting the terminal to transfer data to the relay device, not by using the first protocol, but by using a second protocol, the relay device providing conversion between the first and second protocols, the host-terminal emulation method comprising:

establishing a new receiving connection with the relay device by using the second protocol immediately after a previous set of data is received from the relay device, regardless of whether another set of receive data is due or not due;

establishing a transmitting connection with the relay device by using the second protocol when the data is to be transmitted to the host computer in response to an input operation;

transmitting, via the transmitting connection, the data entered by the input operation to the relay device by means of the second protocol; and receiving, from the relay device via the newly established receiving connection, output data from the host computer by means of the second protocol.

8. The host-terminal emulation method according to claim 7, further comprising the step of establishing another new receiving connection with the relay device immediately upon expiration of a previously established receiving connection.

9. The host-terminal emulation method according to claim 7, wherein the second protocol is a protocol which the relay device uses to deliver contents by means of a Web server function thereof.

10. The host-terminal emulation method according to claim 7, wherein the second protocol is a protocol which permits a connection to be established and cut off each time a request and a response as a unit are performed, respectively.

11. The host-terminal emulation method according to claim 7, wherein when the receiving connection is established, a request is output to the relay device to request start of a function within the relay device to wait for reception of data from the host computer.

12. The host-terminal emulation method according to claim 7, wherein the terminal generates identification information by which the terminal can be uniquely identified on a network or receives the identification information generated by the relay device, and when the transmitting connection and the receiving connection are established with the relay device, the terminal transmits a connection request including the identification information to the relay device.

13. A data relay method for use by a relay device disposed between a firewall and a host computer to relay data between the host computer and a client computer located beyond the firewall, the data relay method comprising:

communicating with the host computer by using a first protocol;

communicating with the client computer through the firewall by using a second protocol;

establishing a new connection with the client computer, immediately after relaying a previous set of data from the host computer to the client computer, regardless of whether another set of data is due or not due; and relaying a new set of data from the host computer to the client computer via the established new connection after converting the new set of data from the first protocol to the second protocol.

14. A host-terminal device that interacts with a host computer via a firewall and a relay device, the host computer communicating with the relay device using a first protocol, the firewall permitting the host-terminal device to reach the relay device, not by using the first protocol, but by using a second protocol, the relay device providing conversion between the first and second protocols, the host-terminal device comprising:

receiving connection establishing means for establishing a new receiving connection with the relay device by using the second protocol, immediately after a previous set of data is received from the relaying device, regardless of whether another set of receive data is due or not due;

transmitting connection establishing means for establishing a transmitting connection with the relay device by using the second protocol when data is to be transmitted to the host computer in response to an input operation;

transmitting means for transmitting, via the transmitting connection established by the transmitting connection establishing means, data entered by the input operation to the relay device by means of the second protocol; and receiving means for receiving, from the relay device via the new receiving connection established by the receiving connection establishing means, output data from the host computer by means of the second protocol.

15. A relay device disposed between a firewall and a host computer to relay data between the host computer and a client computer located beyond the firewall, not by using a first protocol, but by using a second protocol, the relay device comprising:

means for communicating with the host computer by using a first protocol;

means for communicating with the client computer through the firewall by using a second protocol;

means for establishing a new connection of the second protocol with the client computer, immediately after relaying a previous set of data from the host computer to the client computer, regardless of whether another set of data is due or not due; and means for relaying a new set of data from the host computer to the client computer via the established new connection after converting the new set of data from the first protocol to the second protocol.

16. A computer-readable recording medium recording a relay program for use by a computer disposed between a firewall and a host computer to relay data between the host computer and a client computer separated by the firewall, wherein the relay program causes the computer to perform a process comprising:

communicating with the host computer by using a first protocol;

communicating with the client computer through the firewall by using a second protocol;

establishing a new connection of the second protocol with the client computer immediately after relaying a previous set of data from the host computer to the client computer, regardless of whether another set of data is due or not due; and relaying a new set of data from the host computer to the client computer via the established new connection after converting the new set of data from the first protocol to the second protocol.

* * * * *